US011130663B2

(12) United States Patent
Linsmeier et al.

(10) Patent No.: US 11,130,663 B2
(45) Date of Patent: *Sep. 28, 2021

(54) LIGHTWEIGHT PLATFORM FOR A FIRE APPARATUS

(71) Applicant: Oshkosh Corporation, Oshkosh, WI (US)

(72) Inventors: Eric R. Linsmeier, Larsen, WI (US); David W. Archer, Hortonville, WI (US); Eric D. Betz, Clintonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/539,239

(22) Filed: Aug. 13, 2019

(65) Prior Publication Data

US 2019/0359460 A1 Nov. 28, 2019

Related U.S. Application Data

(63) Continuation of application No. 15/881,412, filed on Jan. 26, 2018, now Pat. No. 10,479,664.

(Continued)

(51) Int. Cl.
B66F 11/04 (2006.01)
A62C 27/00 (2006.01)
(Continued)

(52) U.S. Cl.
CPC .............. B66F 11/04 (2013.01); A62C 27/00 (2013.01); B66F 11/044 (2013.01); E06C 5/04 (2013.01); E06C 7/16 (2013.01); B60Y 2200/49 (2013.01)

(58) Field of Classification Search
CPC .............................. B66F 11/044; B66F 11/04
See application file for complete search history.

(56) References Cited

U.S. PATENT DOCUMENTS 2,500,815 A * 3/1950 Gerli ..................... B66F 11/044
182/2.7
4,705,140 A 11/1987 Dudley et al.
(Continued)

FOREIGN PATENT DOCUMENTS

CA 2121181 3/1999
CA 2313669 A1 * 1/2002 ............ B66F 11/044
(Continued)

OTHER PUBLICATIONS

International Search Report and Written Opinion on Application No. PCT/US2018/015504, dated May 29, 2018, 18 pages.
Rosenbauer, "Raptor Aerials", Oct. 2, 2014, 6 pages.

Primary Examiner — Alvin C Chin-Shue
(74) Attorney, Agent, or Firm — Foley & Lardner LLP

(57) ABSTRACT

A fire apparatus includes a chassis, a ladder assembly having a proximal end pivotably coupled to the chassis and a distal end opposite the proximal end, and a basket pivotably coupled to the distal end. The basket includes a subfloor assembly and a floor panel coupled to a top surface of the subfloor assembly and configured to support a user. The subfloor assembly includes a front member and a rear member each extending in a first direction, an inner member extending from the front member to the rear member, and an outer member having a first end portion coupled to the rear member and a second end portion opposite the first end portion. The front member and the rear member are offset a distance from one another in a second direction perpendicular to the first direction. The inner member extends substantially parallel to the outer member.

11 Claims, 26 Drawing Sheets

Related U.S. Application Data

(60) Provisional application No. 62/451,600, filed on Jan. 27, 2017.

(51) Int. Cl.
*E06C 5/04* (2006.01)
*E06C 7/16* (2006.01)

(56) References Cited

U.S. PATENT DOCUMENTS

| | | | |
|---|---|---|---|
| 4,852,690 | A | 8/1989 | Salmi |
| 5,129,480 | A * | 7/1992 | Garrett .................. B66F 11/044 182/141 |
| 5,137,115 | A | 8/1992 | Arnold |
| 5,538,274 | A | 7/1996 | Schmitz et al. |
| 5,722,505 | A * | 3/1998 | Grabner ................ B66F 11/044 182/148 |
| 5,820,150 | A | 10/1998 | Archer et al. |
| 5,897,123 | A | 4/1999 | Cherney et al. |
| 6,145,619 | A * | 11/2000 | Risser .................. B66F 11/044 182/113 |
| 6,405,831 | B1 | 6/2002 | Daniel, III |
| 6,561,718 | B1 | 5/2003 | Archer et al. |
| 6,860,332 | B1 | 3/2005 | Archer et al. |
| 6,882,917 | B2 | 4/2005 | Pillar et al. |
| 6,883,815 | B2 | 4/2005 | Archer |
| 6,976,688 | B2 | 12/2005 | Archer et al. |
| 7,006,902 | B2 | 2/2006 | Archer et al. |
| 7,055,880 | B2 | 6/2006 | Archer |
| 7,387,348 | B2 | 6/2008 | Archer et al. |
| 7,389,826 | B2 | 6/2008 | Linsmeier et al. |
| 7,392,122 | B2 | 6/2008 | Pillar et al. |
| 7,451,028 | B2 | 11/2008 | Pillar et al. |
| 7,631,700 | B1 * | 12/2009 | Gil ......................... A62C 27/00 169/13 |
| 7,756,621 | B2 | 7/2010 | Pillar et al. |
| 7,828,116 | B2 | 11/2010 | Vetesnik |
| 8,201,656 | B2 | 6/2012 | Archer et al. |
| 8,333,390 | B2 | 12/2012 | Linsmeier et al. |
| 8,839,902 | B1 | 9/2014 | Archer et al. |
| 9,061,169 | B2 | 6/2015 | Linsmeier |
| 9,089,728 | B2 | 7/2015 | Halley |
| 9,492,695 | B2 | 11/2016 | Betz et al. |
| 9,580,962 | B2 | 2/2017 | Betz et al. |
| 2002/0100637 | A1 * | 8/2002 | Stringer .................. B66F 11/04 182/148 |
| 2006/0021764 | A1 | 2/2006 | Archer et al. |
| 2006/0032701 | A1 | 2/2006 | Linsmeier et al. |
| 2006/0032702 | A1 | 2/2006 | Linsmeier et al. |
| 2006/0086566 | A1 | 4/2006 | Linsmeier et al. |
| 2008/0063498 | A1 | 3/2008 | Lambert et al. |
| 2009/0096231 | A1 * | 4/2009 | Burlingame ............ B66F 11/04 294/68.3 |
| 2016/0304051 | A1 | 10/2016 | Archer et al. |
| 2017/0101297 | A1 | 4/2017 | Claypool |
| 2017/0252583 | A1 * | 9/2017 | Goeltz .................. B66F 11/046 |
| 2018/0072550 | A1 | 3/2018 | Clark et al. |

FOREIGN PATENT DOCUMENTS

| | | | |
|---|---|---|---|
| CN | 107106883 | | 8/2017 |
| CN | 107206262 | | 9/2017 |
| EP | 0 706 904 | | 4/1996 |
| EP | 1 781 383 | | 5/2007 |
| EP | 1 371 391 | B1 | 12/2009 |
| EP | 1 371 392 | | 9/2010 |
| EP | 2 374 749 | A1 | 10/2011 |
| GB | 2 277 304 | | 2/1997 |
| GB | 300 9436 | | 3/2003 |
| GB | 2 365 829 | | 9/2004 |
| GB | 2 400 588 | | 1/2005 |
| GB | 2 400 589 | | 2/2005 |
| GB | 2 400 590 | | 3/2005 |
| WO | WO-2006/015242 | | 2/2006 |
| WO | WO-2006/015272 | | 2/2006 |
| WO | WO-2006/037100 | | 4/2006 |
| WO | WO-2006/096202 | | 9/2006 |
| WO | WO-2006/101865 | | 9/2006 |
| WO | WO-2009/046246 | | 4/2009 |
| WO | WO-2016/085652 | | 6/2016 |
| WO | WO-2016/085653 | | 6/2016 |
| WO | WO-2006/086614 | | 8/2016 |
| WO | WO-2016/157245 | A1 | 10/2016 |
| WO | WO-2016/171965 | | 10/2016 |
| WO | WO-2016157245 | A1 * | 10/2016 ................ B66F 9/06 |

* cited by examiner

LIGHTWEIGHT PLATFORM FOR A FIRE APPARATUS

CROSS-REFERENCE TO RELATED PATENT APPLICATION

This application is a continuation of U.S. patent application Ser. No. 15/881,412, filed on Jan. 26, 2018, which claims the benefit of U.S. Provisional Patent Application No. 62/451,600, filed Jan. 27, 2017, both of which are incorporated herein by reference in their entireties.

BACKGROUND

The present application relates generally to the field of fire apparatuses. In particular, the present application relates to aerial fire apparatuses including ladder assemblies that support baskets. Fire apparatuses are commonly used in fire emergency situations to evacuate people from burning structures and to contain fires. Fire apparatuses commonly include telescoping ladder assemblies that rotate relative to a body of the fire apparatus and extend over long distances. Such ladder assemblies provide fire fighters with access to elevated areas or other areas that cannot be easily reached on foot (e.g., a car trapped in a flooded area). Certain fire apparatuses are outfitted with a basket coupled to a distal end of the ladder assembly. The basket provides a stable platform on which the operators can stand with a minimal risk of falling. The basket also provides a surface that people evacuating a structure can easily access, even under the stresses of an emergency situation.

Due to the cantilevered nature of telescoping ladder assemblies, the load that the ladder assembly can handle near its distal end is limited, especially when extending the ladder assembly over longer distances. This limited load capacity limits the amount of people and equipment that can be supported by the ladder assembly. Conventional baskets are heavy, and this weight further reduces the load capacity of the ladder assembly that can be used to support people and equipment. Accordingly, there is a need for a lightweight basket for a fire apparatus.

SUMMARY

One exemplary embodiment relates to a fire apparatus including a chassis, a ladder assembly having a proximal end pivotably coupled to the chassis and a distal end opposite the proximal end, and a basket pivotably coupled to the distal end of the ladder assembly. The basket includes a subfloor assembly and a floor panel coupled to a top surface of the subfloor assembly and configured to support a user. The subfloor assembly includes a front member and a rear member each extending in a first direction, an inner member extending from the front member to the rear member, and an outer member having a first end portion coupled to the rear member and a second end portion opposite the first end portion. The front member and the rear member are offset a distance from one another in a second direction perpendicular to the first direction. The inner member extends substantially parallel to the outer member.

Another exemplary embodiment relates to a fire apparatus including a chassis, a ladder assembly having a proximal end pivotably coupled to the chassis and a distal end opposite the proximal end, and a basket pivotably coupled to the distal end of the ladder assembly. The basket includes a subfloor assembly including a first inner member and a second inner member each extending substantially parallel to one another in a first direction, a floor panel coupled to a top surface of the subfloor assembly and configured to support a user, and a first upright member and a second upright member each coupled to the subfloor assembly and extending above the floor panel. The inner members are offset from one another in a second direction perpendicular to the first direction. The upright members are offset from one another in the second direction.

Yet another exemplary embodiment relates to a basket for a fire apparatus including a subfloor assembly and a floor panel coupled to a top surface of the subfloor assembly and configured to support a user. The subfloor assembly includes a front member extending laterally, a rear member extending laterally and offset a distance rearward from the front member, a pair of inner members each extending from the front member to the rear member, a pair of outer members each extending forward from the rear member, and a pair of angled members. Each outer member has a first end portion coupled to the rear member and a second end portion opposite the first end portion. Each angled member extends from the second end portion of one of the outer members to the front member. The outer members are shorter than the distance between the front member and the rear member such that the angled members each extend at an angle relative to the front member.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
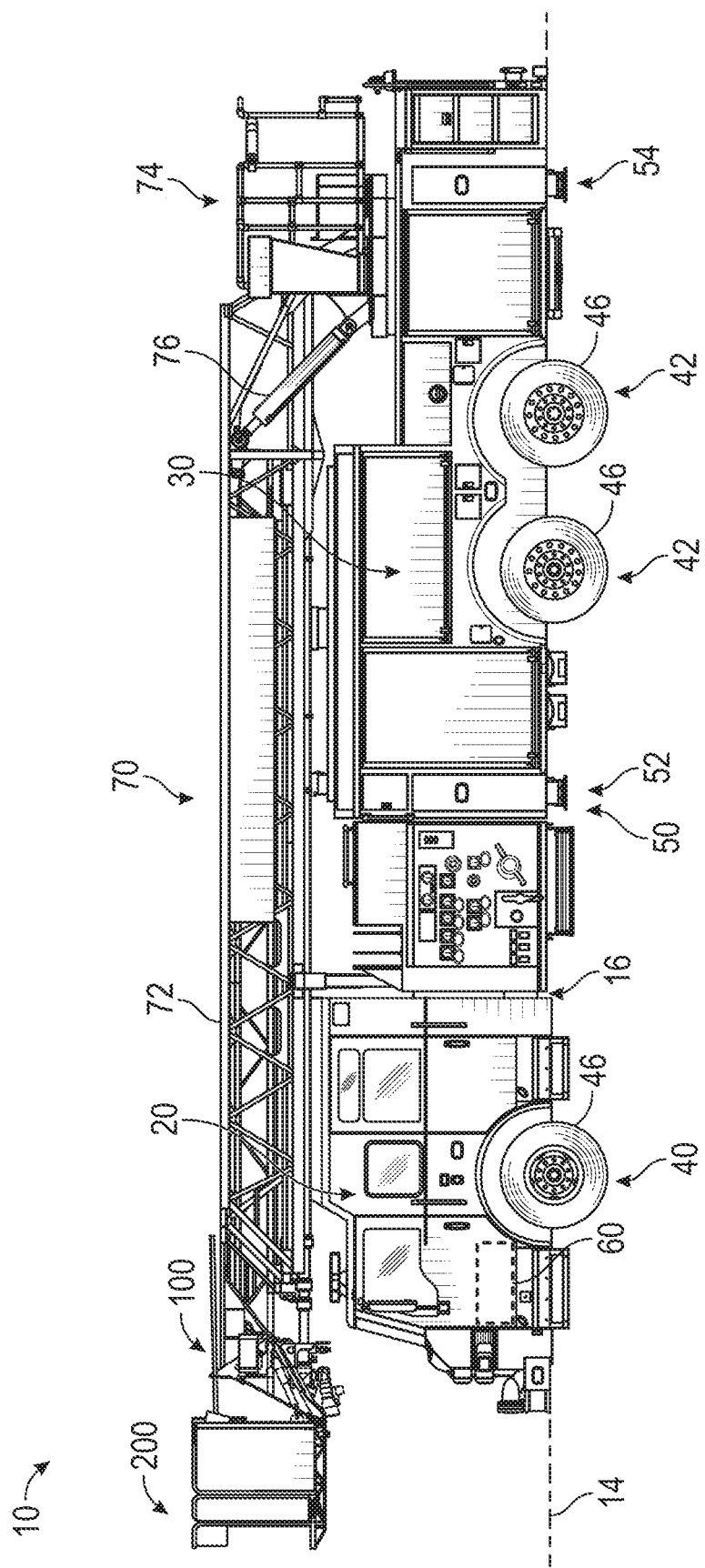
FIG. 1A is a side view of a tandem fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to the exemplary embodiment shown in FIGS. 1A-3, a fire apparatus or firefighting vehicle, shown as fire apparatus 10, includes a cab assembly, shown as front cabin 20, and a body assembly, shown as rear section 30, defining a longitudinal axis 14. In one embodiment, the longitudinal axis 14 extends along a direction defined by a frame or chassis 16 of the fire apparatus 10 (e.g., front-to-back, etc.). As shown in FIGS. 1A-4E, the front cabin 20 is positioned forward of the rear section 30 (e.g., with respect to a forward direction of travel for the fire apparatus 10 along the longitudinal axis 14, etc.). According to an alternative embodiment, the front cabin 20 may be positioned behind the rear section 30 (e.g., with respect to a forward direction of travel for the fire apparatus 10 along the longitudinal axis 14, etc.). The front cabin 20 may be positioned behind the rear section 30 on, by way of example, a rear tiller fire apparatus.

Figure 1B:
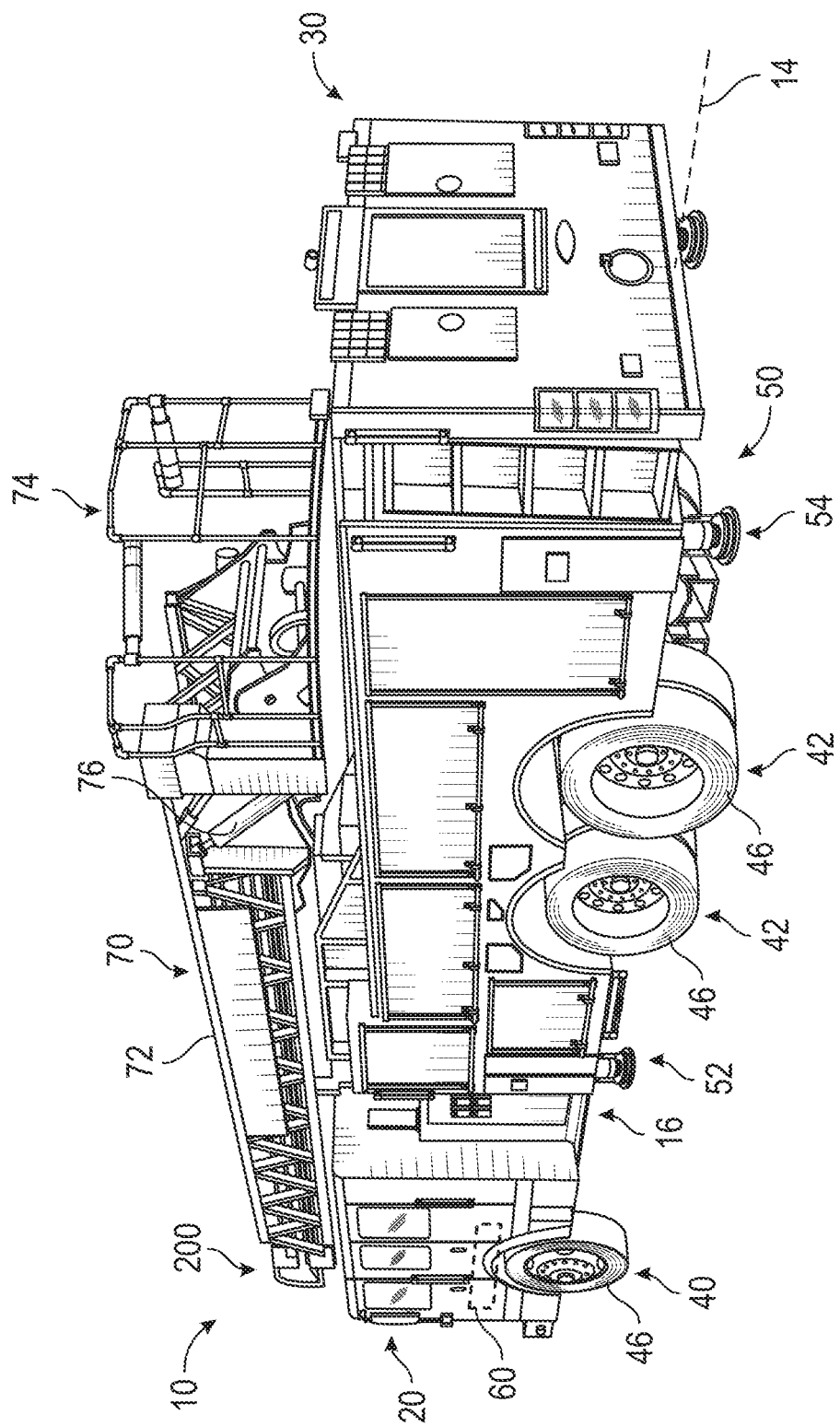
FIG. 1B is a rear perspective view of the tandem rear axle fire apparatus of FIG. 1A, according to an exemplary embodiment.
Figure 2:
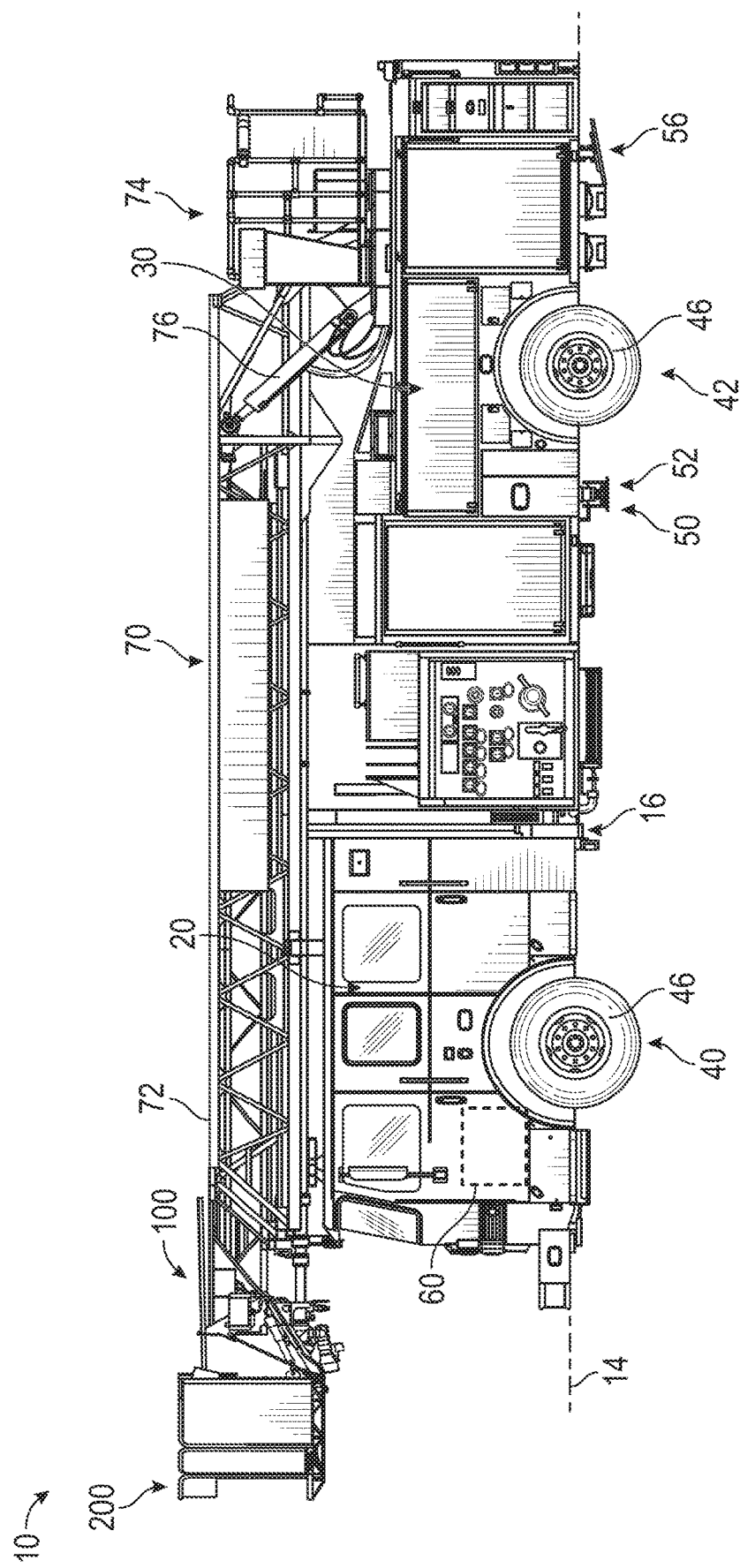
FIG. 2 is a side view of a single rear axle fire apparatus, according to an exemplary embodiment.
Figure 3:
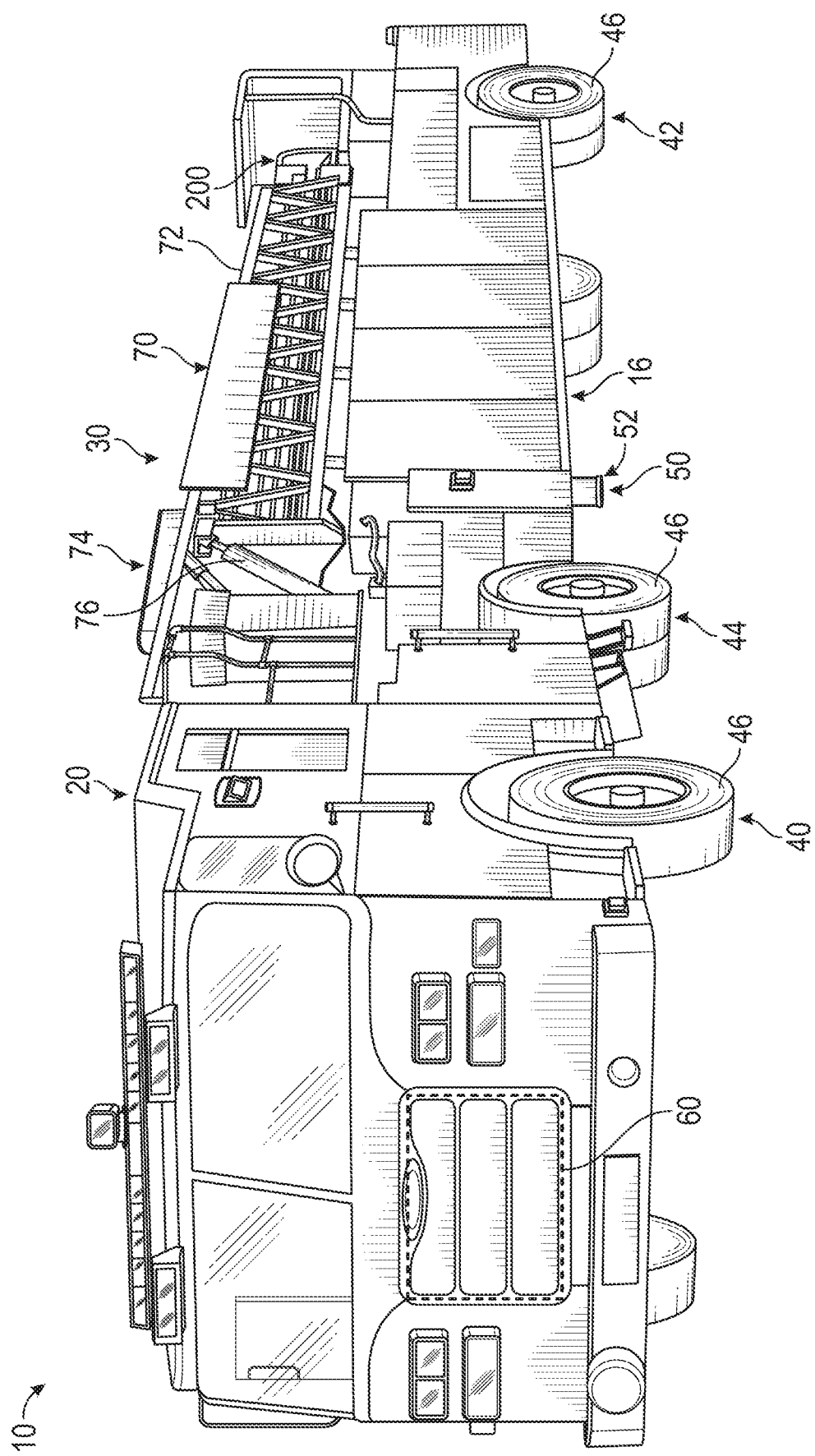
FIG. 3 is a front perspective view of a tiller fire apparatus, according to an exemplary embodiment.

As shown in FIGS. 1A and 1B, the fire apparatus 10 is configured as a tandem rear axle fire apparatus. In this embodiment, the fire apparatus 10 includes a first axle, shown as front axle 40, positioned along the front cabin 20 and a pair of second axles, shown as rear axles 42, positioned along the rear section 30. As shown in FIG. 2, the fire apparatus 10 is configured as a single rear axle fire apparatus. In this embodiment, the fire apparatus 10 has a front axle 40 positioned along the front cabin 20 and a single rear axle 42 positioned along the rear section 30. As shown in FIG. 3, the fire apparatus 10 is configured as a tiller fire apparatus.

In this embodiment, the fire apparatus 10 has a front axle 40 positioned along the front cabin 20, a rear axle 42 positioned along the rear section 30, and a third axle, shown as intermediate axle 44, positioned along the front cabin 20 between the front axle 40 and the rear axle 42. In this embodiment, the rear section 30 of the fire apparatus 10 is pivotably coupled to the front cabin 20 (e.g., similar to a trailer, etc.). As shown in FIGS. 1A-3, the front axle 40, the rear axle(s) 42, and the intermediate axle 44 of the fire apparatus 10 include tractive assemblies, shown as wheel and tire assemblies 46, rotatably coupled to the chassis 16 and configured to support the fire apparatus 10 on the ground. In other embodiments, the fire apparatus 10 includes another type of tractive element (e.g., a track, etc.). In some embodiments, the fire apparatus 10 is configured as another type of fire apparatus (e.g., an aircraft rescue and firefighting ("ARFF") truck, etc.). In alternative embodiments, the vehicle is configured as a vehicle other than a fire apparatus. By way of example, the vehicle may be mining equipment, construction equipment, farming equipment, an aerial truck, a rescue truck, a boom lift, and/or still another vehicle (e.g., any type of vehicle that may include a ladder assembly or boom assembly).

As shown in FIGS. 1A-3, the fire apparatus 10 includes a stabilization system, shown as stabilization system 50. As shown in FIGS. 1A and 1B, the stabilization system 50 of the fire apparatus 10 includes first stabilizers, shown as outriggers 52, positioned along the rear section 30 between the front axle 40 and the rear axles 42, and second stabilizers, shown as downriggers 54, positioned along the rear section 30 rearward of the rear axles 42. In some embodiments, the downriggers 54 of the fire apparatus 10 are replaced with a stability foot. As shown in FIG. 2, the stabilization system 50 of the fire apparatus 10 includes the outriggers 52 positioned along the rear section 30 between the front axle 40 and the rear axle 42 and a third stabilizer, shown as stability foot 56, positioned along the rear section 30 rearward of the rear axle 42. In some embodiments, the stability foot 56 of the fire apparatus 10 is replaced with the downriggers 54. As shown in FIG. 3, the stabilization system 50 of the fire apparatus 10 includes the outriggers 52 positioned along the rear section 30 between the intermediate axle 44 and the rear axle 42. In some embodiments, the fire apparatus 10 additionally includes at least one of the downriggers 54 and the stability foot 56. In some embodiments, the fire apparatus 10 additionally or alternatively includes the outriggers 52, the downriggers 54, and/or the stability foot 56 positioned along the front cabin 20 (e.g., forward of the front axle 40, rearward of the front axle 40, etc.). In other embodiments, the stabilization system 50 is omitted.

As shown in FIGS. 1A-3, the fire apparatus 10 includes a powertrain system, shown as powertrain 60. The powertrain 60 may include a primary driver (e.g., an engine, a motor, etc.), an energy generation device (e.g., a generator, etc.), an energy storage device (e.g., a battery, capacitors, ultracapacitors, etc.) electrically coupled to the energy generation device, and/or a drivetrain (e.g., a transmission, a transfer case, a driveshaft, a differential, the front axle 40, the rear axle(s) 42, the intermediate axle 44, etc.). The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front axle 40, the rear axle(s) 42, and the intermediate axle 44. In some embodiments, the front axle 40, the rear axle(s) 42, and/or the intermediate axle 44 include an individual motive driver (e.g., a motor that is electrically coupled to the energy storage device, etc.) configured to facilitate independently driving each of the wheel and tire assemblies 46. In some embodiments, a transmission of the fire apparatus 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 46, etc.). The final drive may then propel or move the fire apparatus 10. In such embodiments, the fire apparatus 10 may not include the generator and/or the energy storage device. The powertrain 60 of the fire apparatus 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, propane, hydrogen, electricity, etc.).

As shown in FIGS. 1A-3, the fire apparatus 10 includes a ladder assembly, shown as aerial ladder assembly 70. The aerial ladder assembly 70 includes a ladder 72 and a turntable assembly, shown as turntable 74, coupled to a first end (e.g., base end, proximal end, pivot end, lower end, etc.) of the ladder 72. A platform, shown as basket 200, is coupled to an opposing, second end (e.g., free end, distal end, platform end, implement end, water nozzle end, etc.) of the ladder 72. According to an exemplary embodiment, the ladder 72 includes a plurality of ladder sections. In some embodiments, the plurality of sections of the ladder 72 are extendable. An actuator may selectively reconfigure the ladder 72 between an extended configuration and a retracted configuration. By way of example, the ladder 72 may include a plurality of nested sections that telescope with respect to one another. In the extended configuration (e.g., deployed position, use position, etc.), the ladder 72 may be lengthened such that the basket 200 is extended away from the fire apparatus 10. In the retracted configuration (e.g., storage position, transport position, etc.), the ladder 72 may be shortened such that the basket 200 is withdrawn towards the fire apparatus 10. In other embodiments, the ladder 72 includes a single, fixed length ladder section. In an alternative embodiment, the fire apparatus 10 does not include the aerial ladder assembly 70, but may alternatively include a boom lift, crane assembly, or another type of moveable and/or extendable assembly. Accordingly, the ladder 72 may include a single lader section, multiple ladder sections configured to extend and retract relative to one another, one or more boom sections (e.g., structural members without steps), or a combination thereof.

The turntable 74 may be directly or indirectly coupled to the chassis 16 (e.g., with an intermediate superstructure, a torque box, through the rear section 30, etc.). According to an exemplary embodiment, the turntable 74 is pivotably coupled to the rear section 30. In some embodiments, the turntable is rotatable a full 360 degrees. In some embodiments, the rotation of the turntable 74 is limited to a range of less than 360 degrees (e.g., dependent on the stability of the fire apparatus 10, the operating parameters of the aerial ladder assembly 70, etc.). The turntable 74 may be coupled to an actuator positioned to facilitate pivoting (e.g., rotating, turning, etc.) the turntable 74. In one embodiment, the actuator is an electric motor (e.g., an alternating current (AC) motor, a direct current motor (DC), etc.) configured to convert electrical energy into mechanical energy. In other embodiments, the actuator is powered by air (e.g., pneumatic, etc.), a fluid (e.g., a hydraulic cylinder, etc.), mechanically (e.g., a flywheel, etc.), or another source. In other embodiments, the turntable 74 is fixed to the rear section 30 (i.e., cannot rotate).

As shown in FIGS. 1A-2, the fire apparatus 10 includes the ladder assembly 70 in a rear mount configuration. In a rear mount configuration, the pedestal 74 is positioned rearward of the rear axles 46. In other embodiments, the ladder assembly 70 is positioned in a mid mount configuration. In a mid mount configuration, the pedestal 74 is positioned between the front axle 40 and the rear axle 42. In FIG. 3, the fire apparatus 10 is a tiller configuration where the rear section 30 is pivotable relative to the front cabin 20. In this configuration, the pedestal 74 is coupled to the rear section 30 near a front end of the rear section 30. In this configuration, the pedestal 74 may extend directly above the intermediate axle 44.

As shown in FIGS. 1A-2, the first end of the ladder 72 is pivotably coupled to the turntable 74. Actuators, shown as cylinders 76 are positioned to pivot the ladder 72 and/or the basket 200 about a horizontal axis (e.g., a axis that extends through a pivotal joint between the ladder 72 and the turntable 74, etc.). The actuator may be a linear actuator, a rotary actuator, or still another type of device and may be powered hydraulically, pneumatically, electrically, or still otherwise powered. In one embodiment, the ladder 72 is pivotable between a lowered position (e.g., the position shown in FIGS. 1A-3, etc.) and a raised position. The ladder 72 may be generally horizontal or at a relatively shallow angle (e.g., 10 degrees, etc.) below or above horizontal when disposed in the lowered position (e.g., a stored position, etc.). In one embodiment, extension and retraction of the cylinders 76 pivots the ladder 72 and the basket 200 about the horizontal axis and raises or lowers, respectively, the second end of ladder 72 (e.g., the basket 200, etc.). In the raised position, the aerial ladder assembly 70 facilitates accessing an elevated height (e.g., for a fire fighter, a person being aided by the fire fighter, etc.).

According to an exemplary embodiment, the aerial ladder assembly 70 forms a cantilever structure when at least one of raised vertically and extended horizontally. The aerial ladder assembly 70 is supported by the cylinders 76 and by the turntable 74 at the first end. The aerial ladder assembly 70 supports static loading from its own weight, the weight of any equipment coupled to the ladder 72 (e.g., the basket 200, the nozzle 150, the conduit 152 coupled to the nozzle 150, etc.), and the weight of any persons using the ladder 72 and/or the basket 200. The aerial ladder assembly 70 may also support various dynamic loads (e.g., forces imparted by a fire fighter or other persons climbing the ladder 72; wind loading; loading due to rotation, elevation, or extension of aerial ladder assembly; the weight of persons in the basket 200; etc.). Such static and dynamic loads are carried by the aerial ladder assembly 70. The forces carried by the cylinders 76, the turntable 74, and/or the chassis 16 may be proportional (e.g., directly proportional, etc.) to the length of the ladder 72.

Figure 4A:
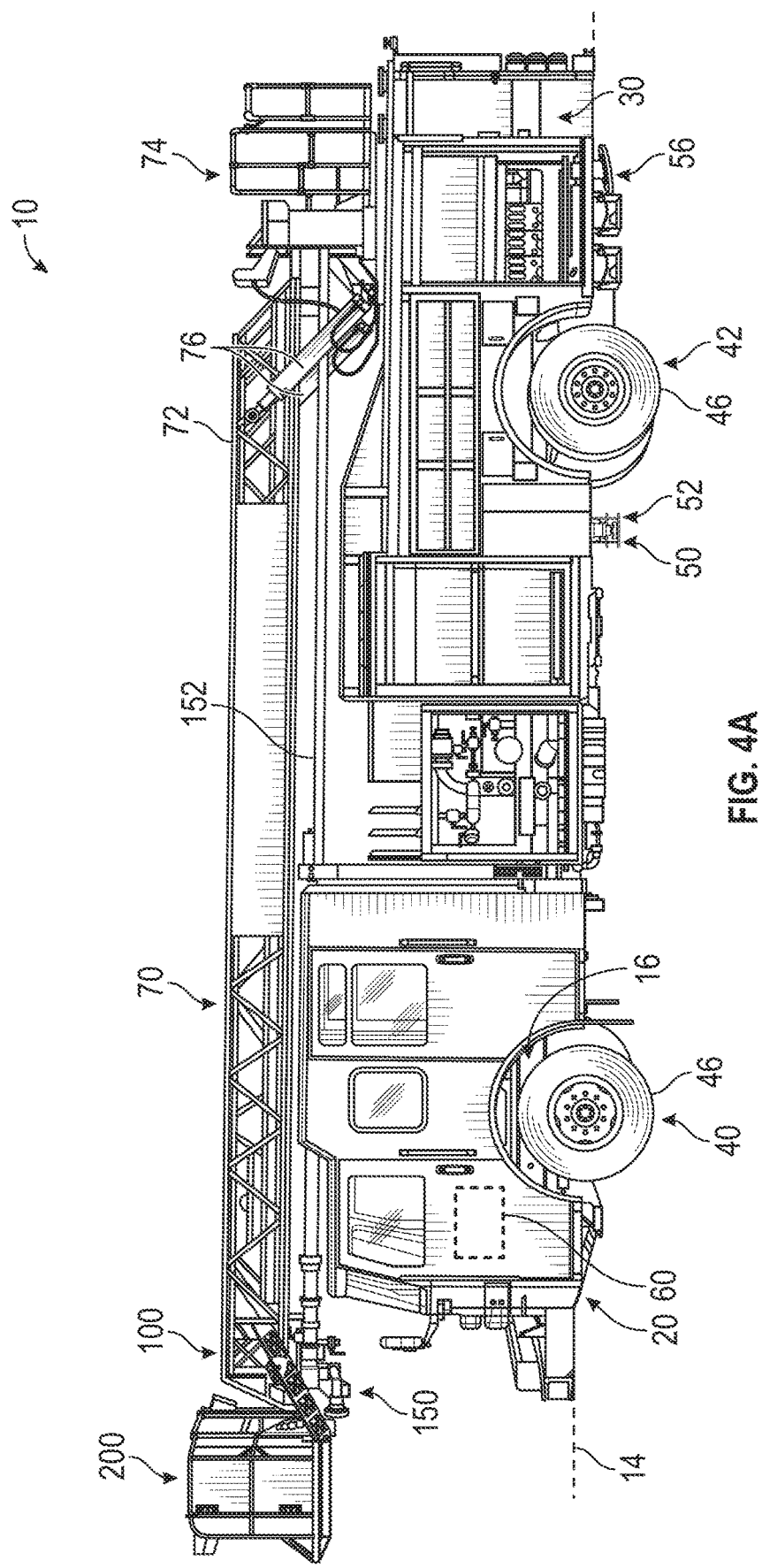
FIG. 4A is a left side view of a fire apparatus, according to an exemplary embodiment.
Figure 4B:
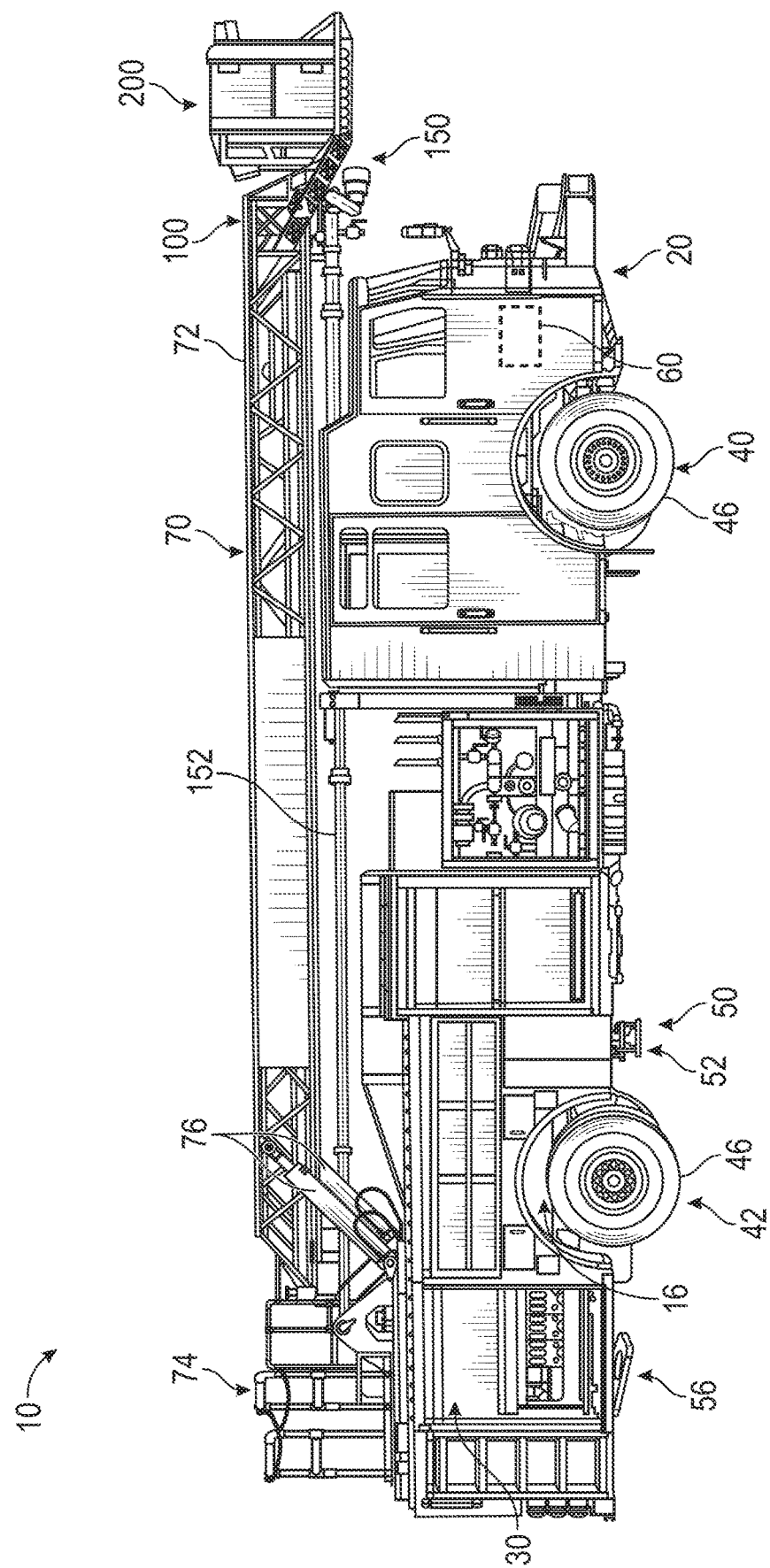
FIG. 4B is a right side view of the fire apparatus of FIG. 4A.
Figure 5A:
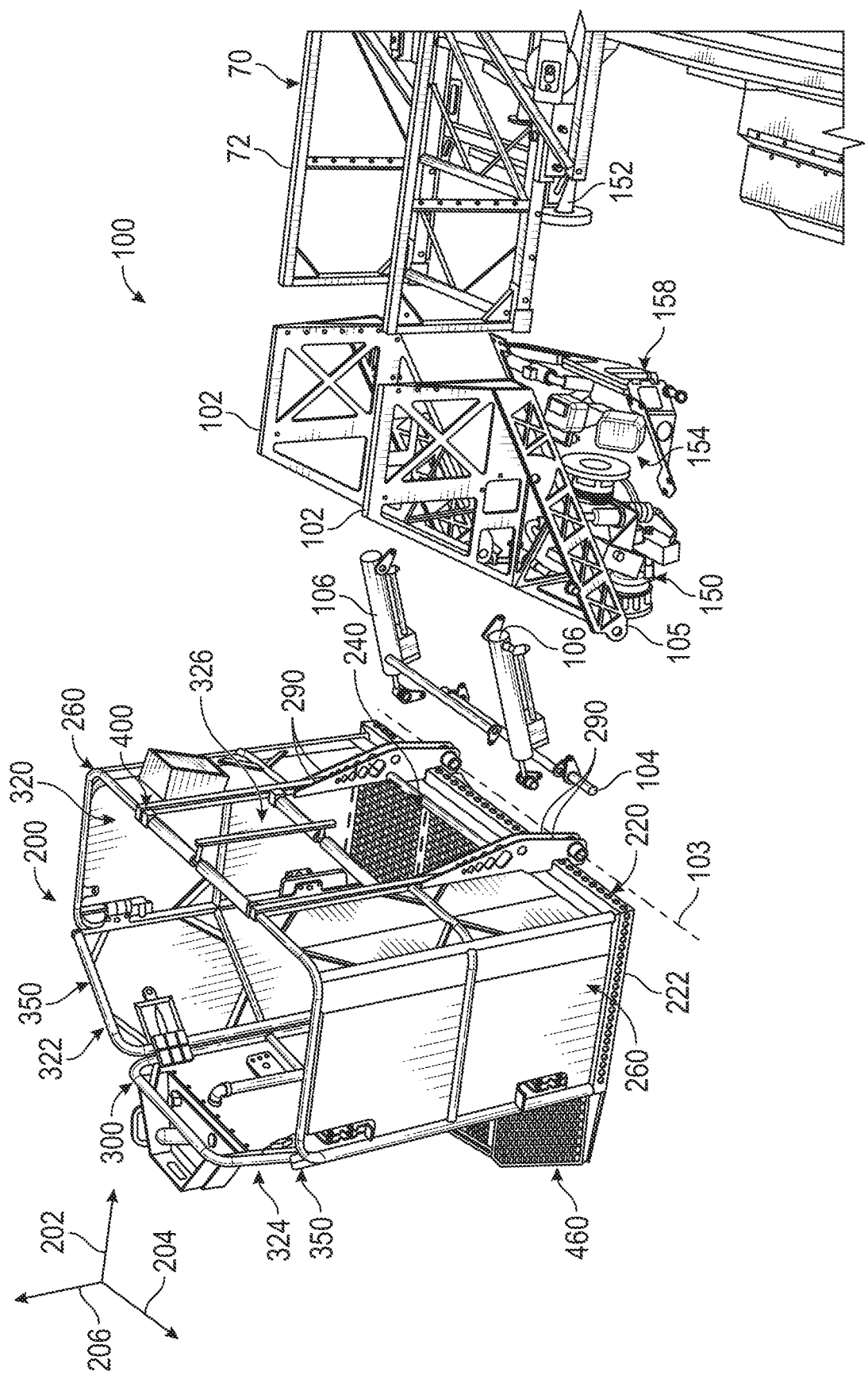
FIG. 5A is an exploded view of a section of the fire apparatus of FIG. 4A.
Figure 5B:
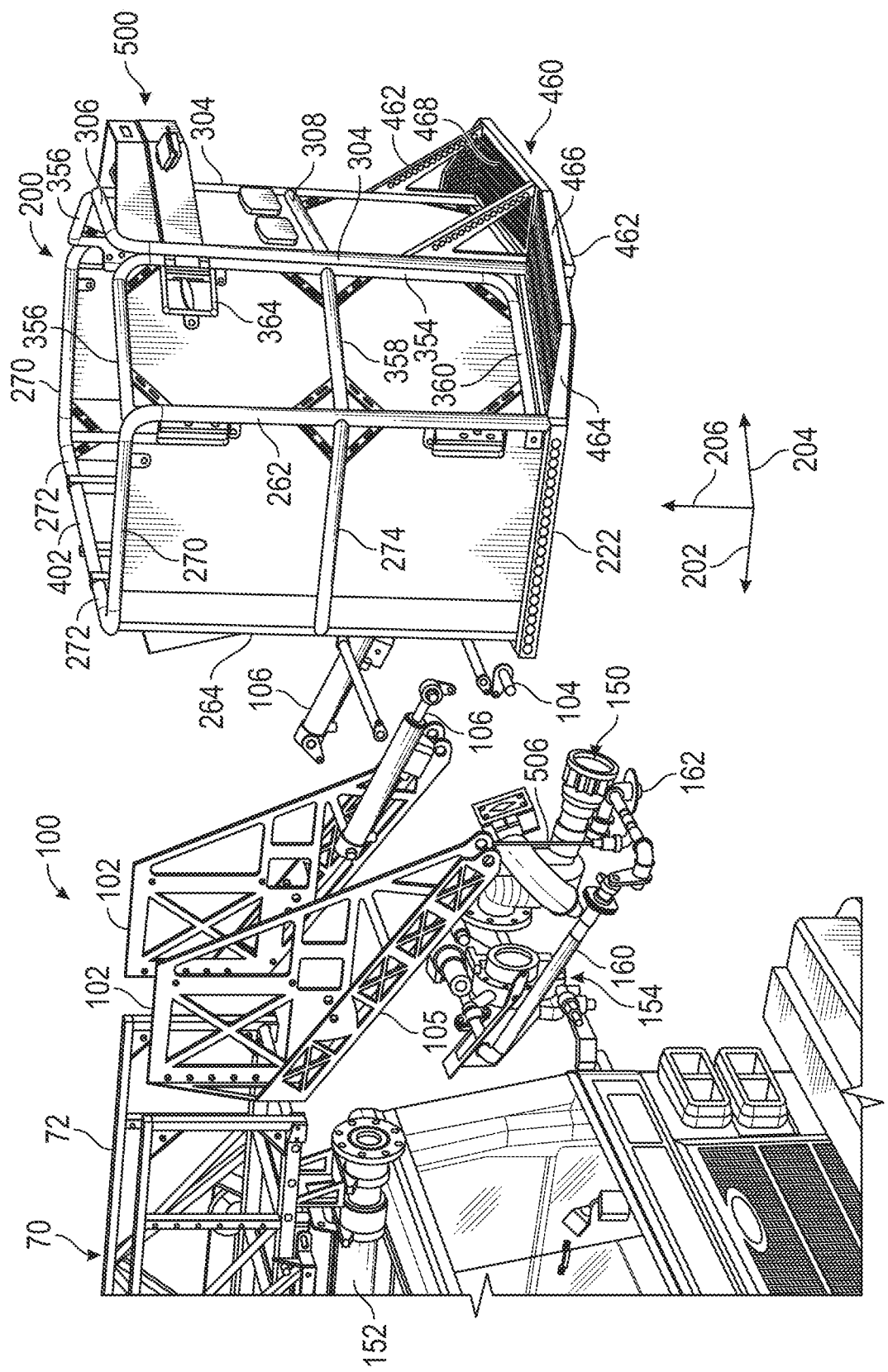
FIG. 5B is another exploded view of a section of the fire apparatus of FIG. 4A.
Figure 5C:
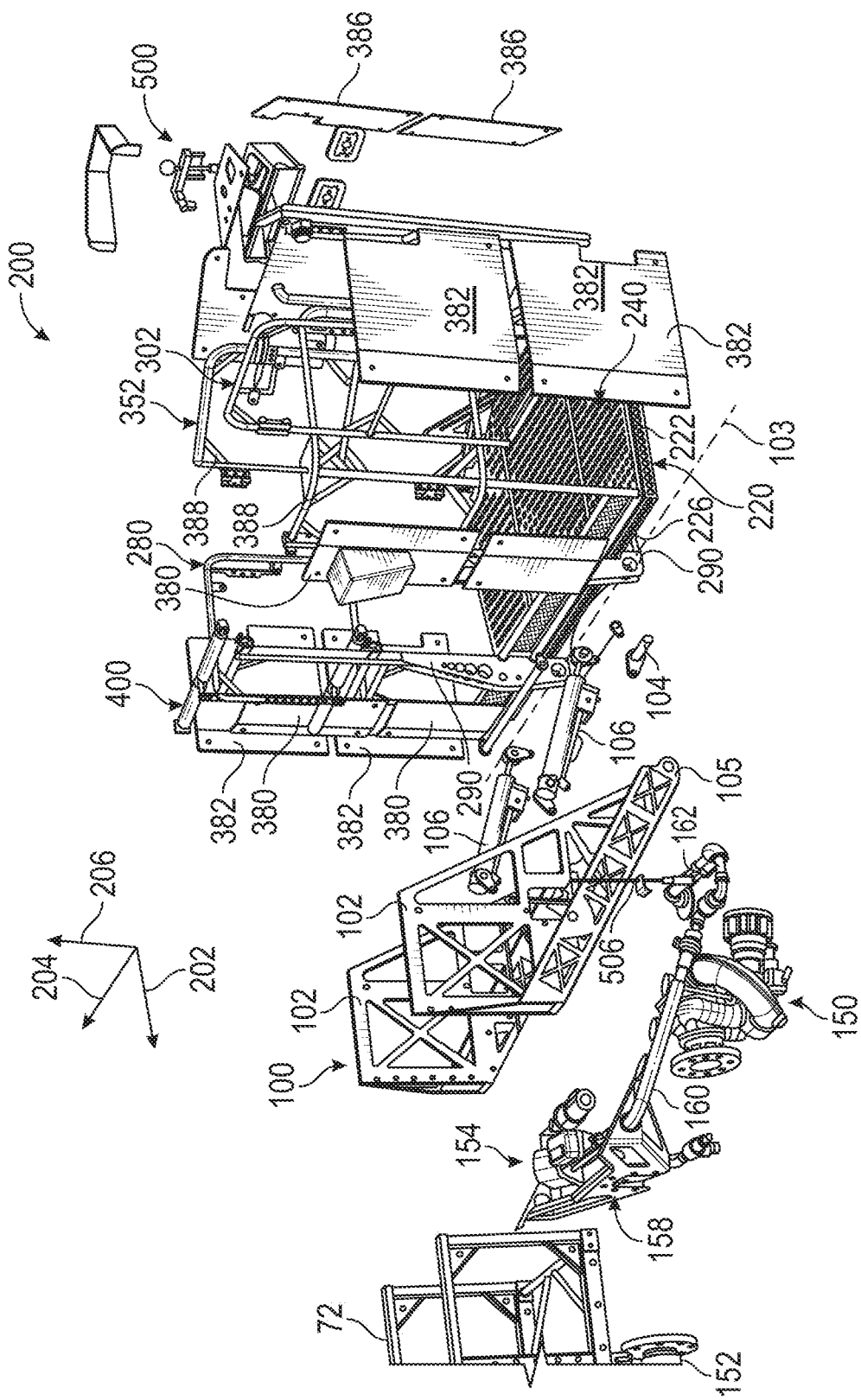
FIG. 5C is another exploded view of a section of the fire apparatus of FIG. 4A.

As shown in FIGS. 4A-5C, the basket 200 is coupled to the ladder 72 through a mount, shown as mount assembly 100. As shown in FIGS. 5A-5C, the mount assembly 100 includes a first set of side plates, shown as side plates 102, each side plate 102 having a first end coupled to the ladder 72 and a second end coupled to the basket 200. The second end of the side plates 102 may be pivotably coupled to the basket 200 such that the basket 200 pivots about a horizontal axis 103 (e.g., an axis that extends through a pivotal joint between the basket 200 and the side plates 102, etc.). By pivotably coupling the basket 200 to the mount assembly 100, the basket 200 may be rotated relative to the mount assembly 100 in order to maintain a consistent vertical orientation of the basket 200 when the ladder 72 moves between the raised and lowered positions. In some embodiments, the horizontal axis 103 about which basket 200 pivots is vertically offset below the ladder 72 when the ladder 72 is in a horizontal configuration to facilitate passage of an operator between the ladder 72 and the basket 200. Additionally, a distance between the side plates 102 may be adjusted to facilitate passage of a user between the side plates 102.

As shown in FIGS. 5A-5C, the mount assembly 100 includes a set of pins, shown as pivot pins 104, about which the basket 200 is configured to pivot. According to an exemplary embodiment, the pivot pins 104 are aligned with the horizontal axis 103 about which the basket 200 pivots. As shown in FIGS. 5A-5C, the mount assembly 100 further includes a second set of side plates, shown as side plates 105. In some embodiments the side plates 105 are positioned parallel to the side plates 102 and are laterally offset a distance outside of the side plates 102. According to an exemplary embodiment, the side plates 102 and the side plates 105 are configured to each support an end of the corresponding pivot pin 104. In some embodiments, each side plate 102 is integrally formed with each side plate 105 as a single unitary body (e.g., formed from a single piece of sheet metal).

As shown in FIGS. 5A-5C, the basket 200 is pivotably coupled to the mount assembly 100 with one or more actuators, shown as cylinders 106. According to an exemplary embodiment, the cylinders 106 are positioned to pivot the basket 200 about the pivot pins 104. The actuators may be linear actuators, rotary actuators, or still other types of devices and may be powered hydraulically, pneumatically, electrically, or still otherwise powered. In one embodiment, extension and retraction of the cylinders 106 pivots the basket 200 about the horizontal axis 103. The cylinders 106 are pivotably coupled to the basket 200 at a first end, and pivotably coupled to the mount assembly 100 at a second end opposite the first end. The locations of the points at which the cylinders 106 are coupled to the basket 200 and the mount assembly 100 may be selected to optimize the mechanical advantage of the cylinders 106 on the basket 200. As shown in FIGS. 5A-5C, each cylinder 106 extends directly between the corresponding side plate 102 and the corresponding side plate 105.

Figure 6:
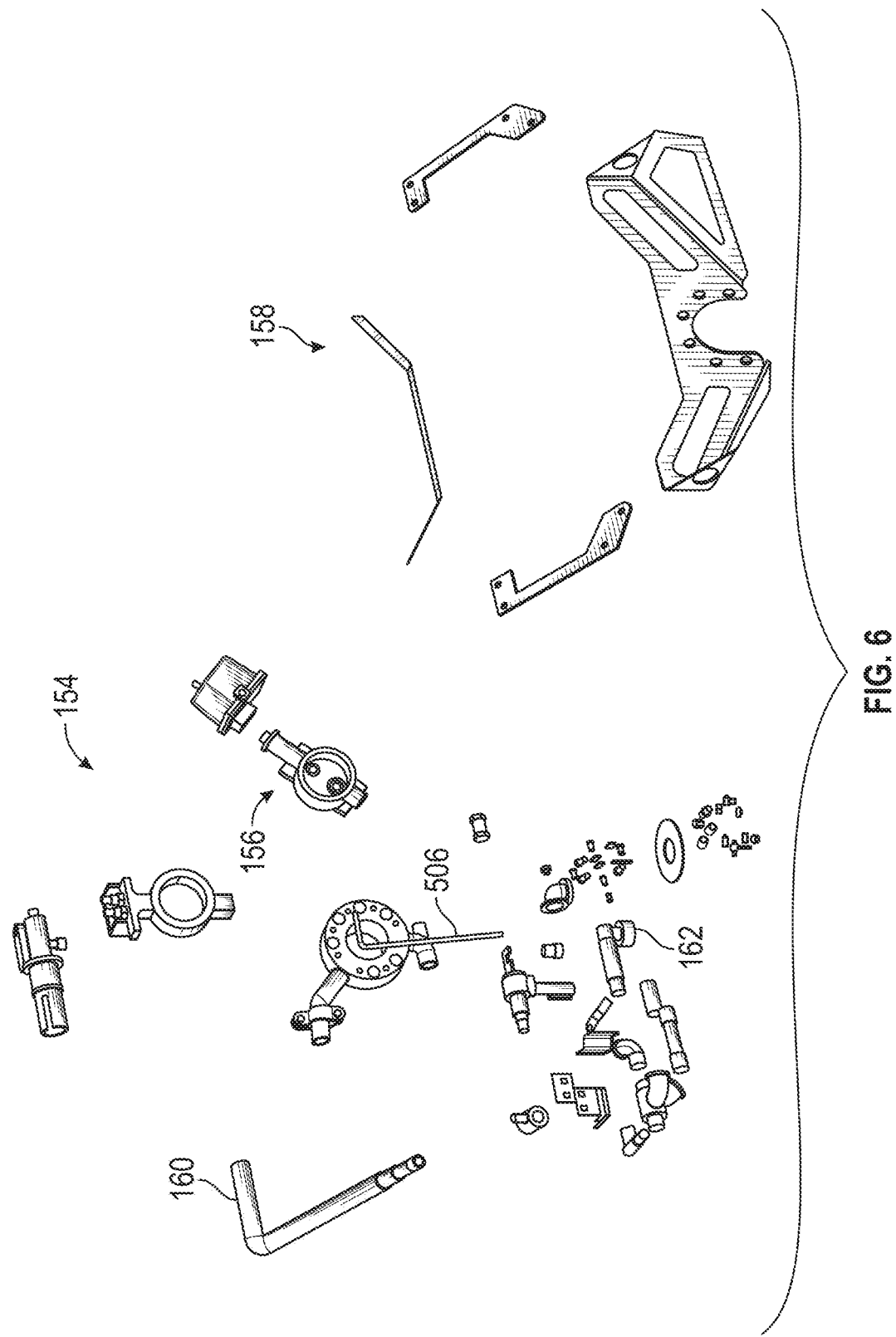
FIG. 6 is an exploded view of a waterway assembly and a waterway mount of the fire apparatus of FIG. 4A.

According to the exemplary embodiment shown in FIGS. 5A-5C, the aerial ladder assembly 70 further includes a nozzle (e.g., a deluge gun, a water cannon, a deck gun, a monitor, etc.), shown as nozzle 150. As shown in FIGS. 4A and 4B, the nozzle 150 may be connected to a source of fire suppressant fluid (e.g., an onboard water tank, an external source such as a fire hydrant or tanker truck, etc.) through a pipe, hose, or conduit, shown as conduit 152. The conduit 152 may be configured to telescope or otherwise extend to accommodate extension of the ladder 72. As shown in FIGS. 5A-6, the conduit 152 extends along the aerial ladder assembly 70 (e.g., along the side of the aerial ladder assembly 70, beneath the aerial ladder assembly 70, in a channel provided in the aerial ladder assembly 70, etc.). By pivoting the aerial ladder assembly 70 into the raised position, the nozzle 150 may be elevated to facilitate expelling fire suppressant fluid (e.g., water, foam, etc.) from a higher elevation to suppress a fire. In some embodiments, the aerial ladder assembly 70 does not include the nozzle 150.

As shown in FIGS. 5A-6, a waterway, shown as waterway assembly 154, is structurally and fluidly coupled between the conduit 152 and the nozzle 150. Waterway assembly 154 may include a valve 156 (e.g., an electrically actuated valve, a mechanically actuated valve, etc.) configured to control the flow of fluid to the nozzle 150. The waterway assembly 154 is coupled to the mount assembly 100 by a mounting bracket, shown as waterway mount 158. In some embodiments, the waterway assembly 154 is capable of sending 1500 gallons per minute of fluid to the nozzle 150. In other embodiments, the waterway assembly 154 is capable of sending more or less than 1500 gallons per minute to the nozzle 150. In some embodiments, the waterway assembly 154 includes one or more conduits (e.g., a conduit 160) to direct a portion of the flow of fluid along a secondary flow path to another location (e.g., to a single monitor, to multiple monitors, to a shower nozzle, etc.). In some embodiments, the waterway assembly 154 is capable of sending 1250 gallons per minute of fluid along the secondary flow path. In other embodiments, the waterway assembly 154 is capable of sending more or less than 1250 gallons per minute along the secondary flow path. As shown in FIGS. 5C and 6, a secondary flow path includes a conduit 160 that directs fluid to a nozzle assembly, shown as shower nozzle 162, that is coupled to an underside of the basket 200. The shower nozzle 162 may be configured to provide a spray of water to reduce the temperature of the basket 200 when near a fire or other heat source. The shower nozzle 162 may spray fluid directly onto the basket or may spray fluid below the basket 200. The waterway assembly 154 may direct approximately 75 gallons per minute along the secondary flow path in this configuration. In other embodiments, the waterway assembly 154 is omitted.

Referring to FIGS. 7A-7F, a basket or platform is shown on the fire apparatus 10 as a basket 200. The basket 200 provides a platform from which a fire fighter may complete various tasks (e.g., operate the nozzle 150, create ventilation in a structure, overhaul a burned area, perform a rescue operation, etc.). The basket 200 may be configured to hold users including at least one of fire fighters (i.e., operators) and persons being aided by the fire fighters. In some embodiments, the rear end of the basket 200 is accessible through an opening (e.g., the third access opening 326) from the ladder 72 to facilitate access to the basket 200 from the ground. In some embodiments, the front and/or sides of the basket 200 are accessible through an opening (e.g., the first access opening 322 or the second access opening 324) to facilitate accessing a location remote from the chassis 16. The basket 200 may include one or more walls, railings, and/or doors around a perimeter of the basket to support the fire fighters and prevent accidental egress from the basket 200. The basket 200 is defined herein using a longitudinal axis 202, a lateral axis 204, and a vertical axis 206. The longitudinal axis 202, the lateral axis 204, and the vertical axis 206 are in a fixed orientation relative to the basket 200 regardless of the position of the basket 200 relative to the ladder 72 or the chassis 16.

Figure 8:
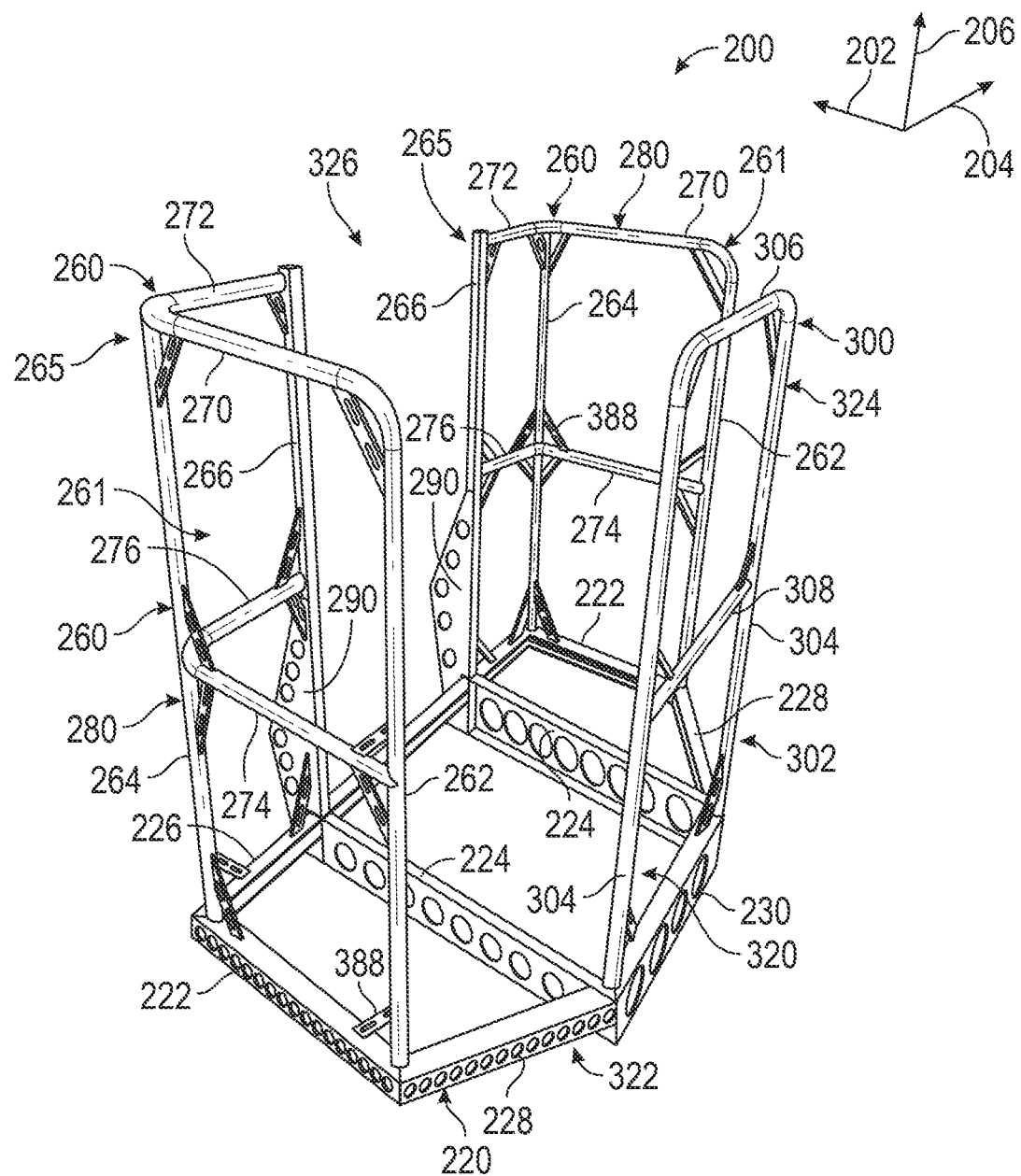
FIG. 8 is a perspective view of a basket of the fire apparatus of FIG. 4A, according to an exemplary embodiment.
Figure 9:
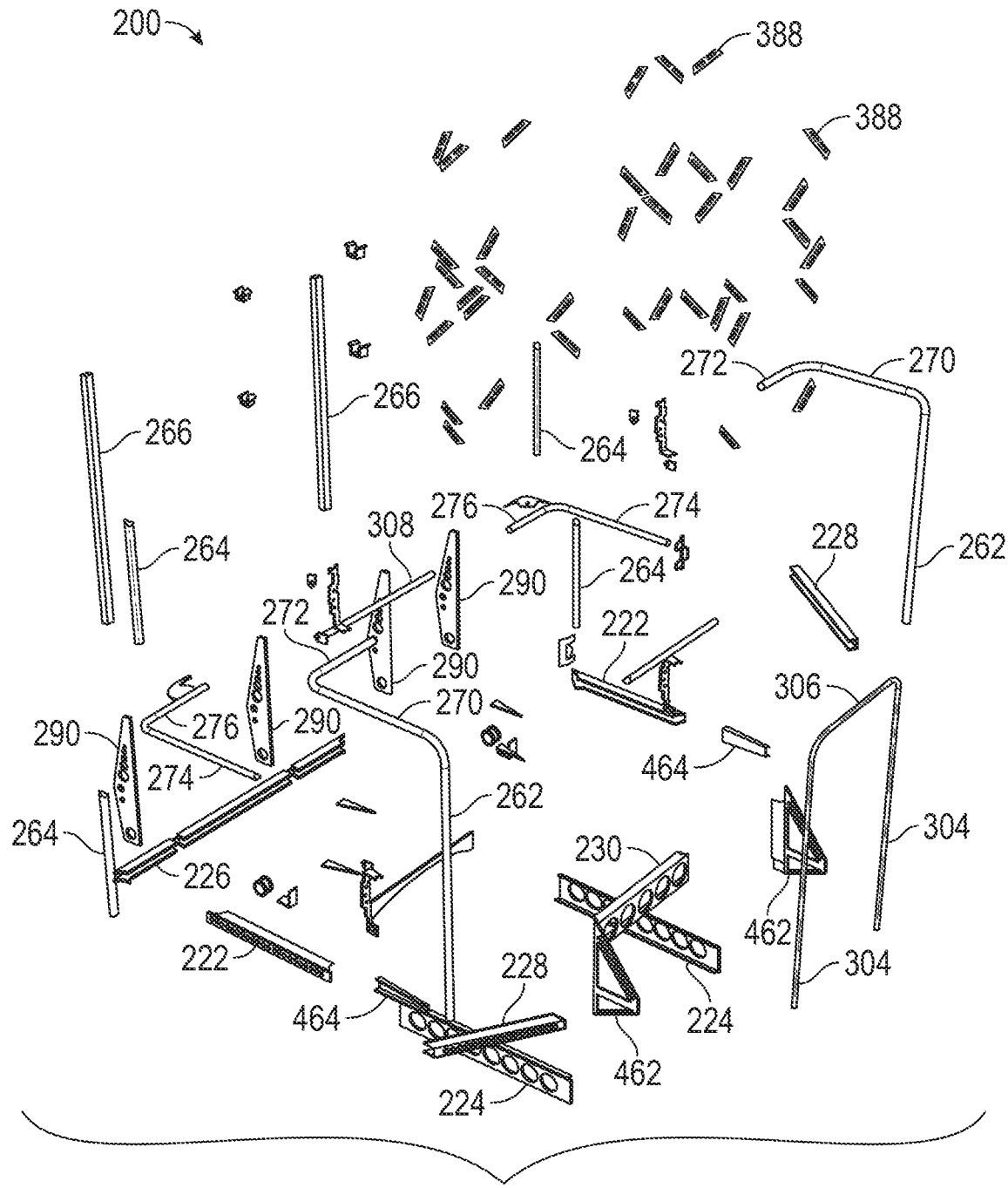
FIG. 9 is an exploded view of a basket of the fire apparatus of FIG. 4A, according to another exemplary embodiment.

As shown in FIGS. 5C, 8, and 9, the basket 200 includes a subfloor assembly, shown as lower frame assembly 220. The lower frame assembly 220 includes a set of lower side members, shown as outer members 222, each having a front end portion and a rear end portion, and a set of lower center members, shown as inner members 224, each having a front end portion and a rear end portion. The outer members 222 and the inner members 224 extend longitudinally (i.e., in a longitudinal direction) with respect to the basket 200 along the lower frame assembly 220. Accordingly, the outer members 222 and the inner members 224 may extend substantially parallel to one another. Alternatively, one or more of the outer members 222 and the inner members 224 may extend at an angle (i.e., not parallel or perpendicular) to one another. The outer members 222 are laterally offset a first distance from one another, and the inner members 224 are laterally offset a second distance from one another, where the first distance is larger than the second distance. The inner members 224 extend directly between the outer members 222. The inner members 224 are longer than the outer members 222.

As shown in FIGS. 8 and 9, the lower frame assembly 220 includes a lower rear member, shown as rear member 226, disposed at a rear end portion of the lower frame assembly 220. The rear member 226 extends laterally (i.e., in a lateral direction) with respect to the basket 200 and has a left end portion and a right end portion. The left end portion and the right end portion of the rear member 226 are directly coupled to the rear end portions of each outer members 222, respectively. The rear end portions of the inner members 224 are coupled to the rear member 226 between the left and right end portions of the rear member 226. The inner member 224 may be directly or indirectly coupled to the rear member 226. The outer members 222 and the inner members 224 extend longitudinally forward from the rear member 226.

As shown in FIGS. 8 and 9, the lower frame assembly 220 further includes a set of lower angled members, shown as angled members 228, each having a front end portion and a rear end portion. The rear end portions of the angled members 228 are directly coupled to the front end portions of the outer members 222. The angled members 228 extend at an angle from the outer members 222 longitudinally forward (i.e., away from the rear member 226) and laterally inward (i.e., towards a longitudinal centerline of the basket 200 that extends in a longitudinal direction).

As shown in FIGS. 8 and 9, a lower front member, shown as front member 230, is disposed at a front end of the lower frame assembly 220 and extending laterally. The front member 230 may or may not extend substantially parallel to the rear member 226. The front member 230 is longitudinally offset a distance from the rear member 226. This distance is greater than the lengths of the outer members 222. The front member 230 is directly coupled to the front end portion of each inner member 224. The front member 230 may be directly or indirectly (e.g., through the inner members 224) coupled to the front end portion of each angled member 228. The front member 230 has a width approximately equal to the distance between the inner members 224. In other embodiments, the front member is wider than the distance between the inner members 224 and accordingly is shorter than the rear member 226. In some embodiments, the angled members 228 are omitted, and the front member 230 extends to the outer members 222. As shown in FIGS. 8 and 9, the outer members 222, the inner members 224, the rear member 226, the angled members 228, and the front member 230 are made from C-shaped channel. The outer members 222, the inner members 224, the rear member 226, the angled members 228, and the front member 230 may be made with material having various cross sectional shapes (e.g., channel, square tube, round tube, etc.) and dimensions and from various materials (e.g., stainless steel, aluminum, etc.). For example, the outer members 222 shown as being made from channel of a first height, and the inner members 224 are shown as being made from channel with a second, larger height. The outer members 222, the inner members 224, the rear member 226, the angled members 228, and the front member 230 may each be formed from multiple individual members (e.g., in the form of a truss).

Figure 7A:
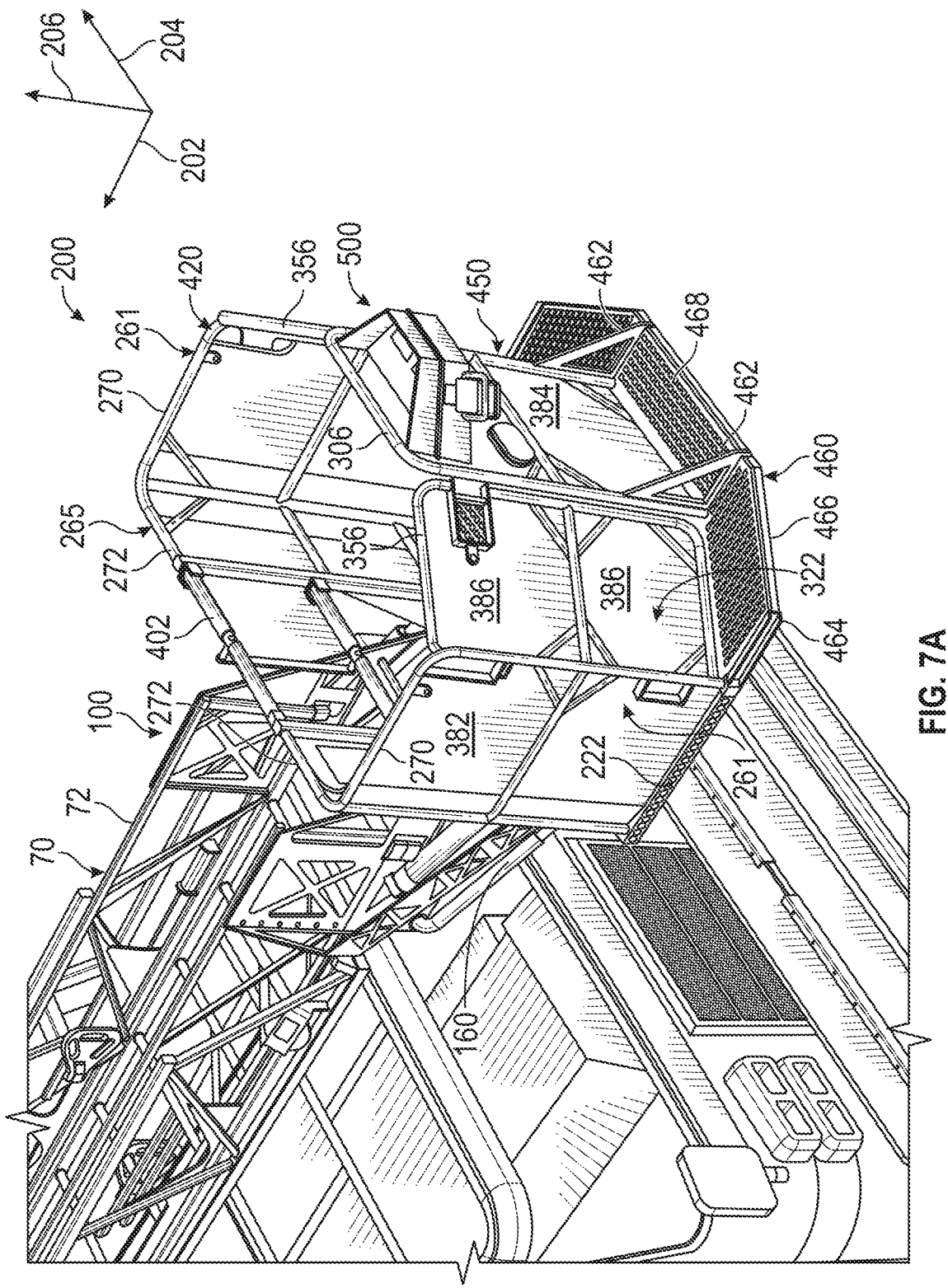
FIG. 7A is a perspective view of a section of the fire apparatus of FIG. 4A.
Figure 7B:
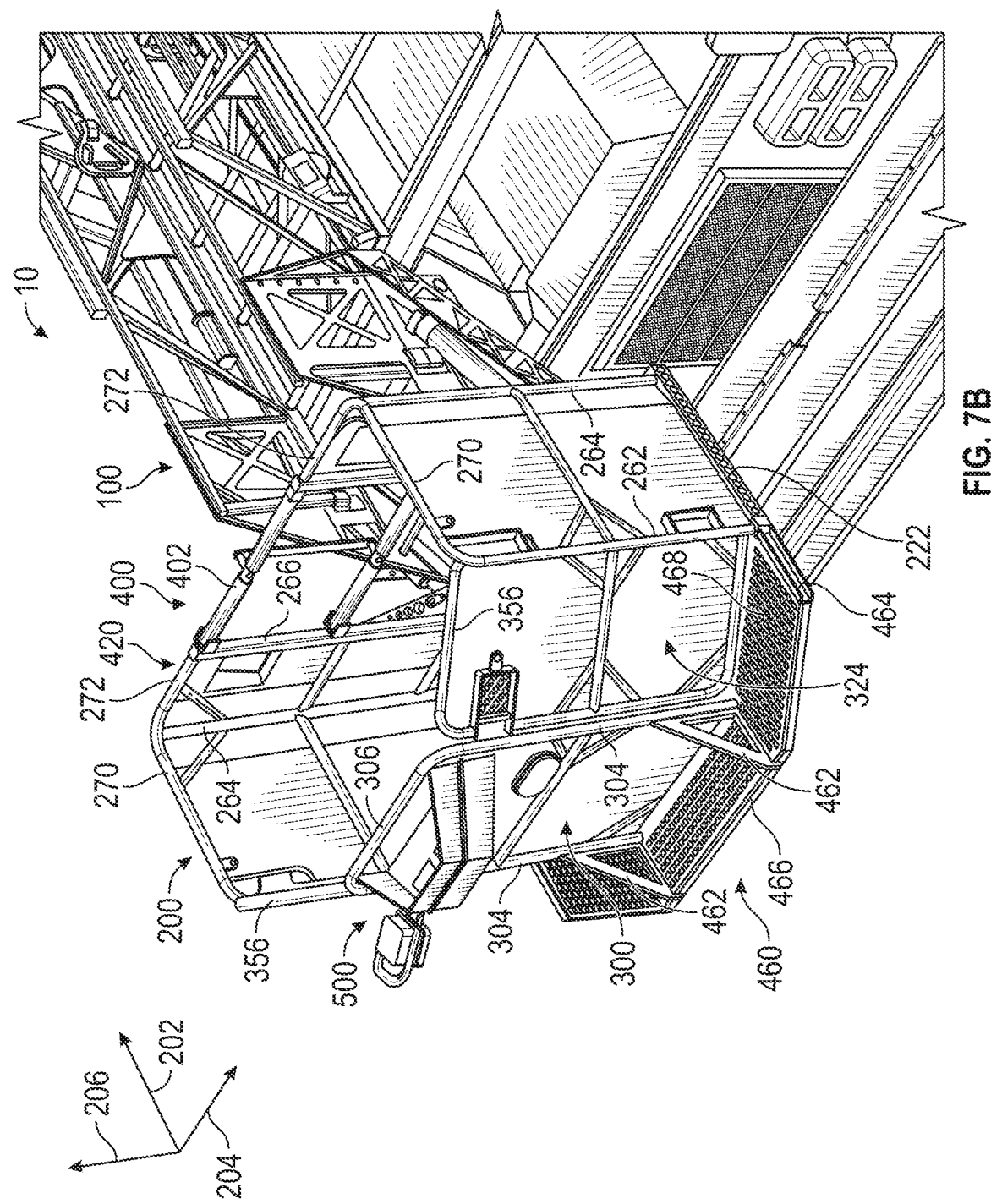
FIG. 7B is another perspective view of a section of the fire apparatus of FIG. 4A.
Figure 7C:
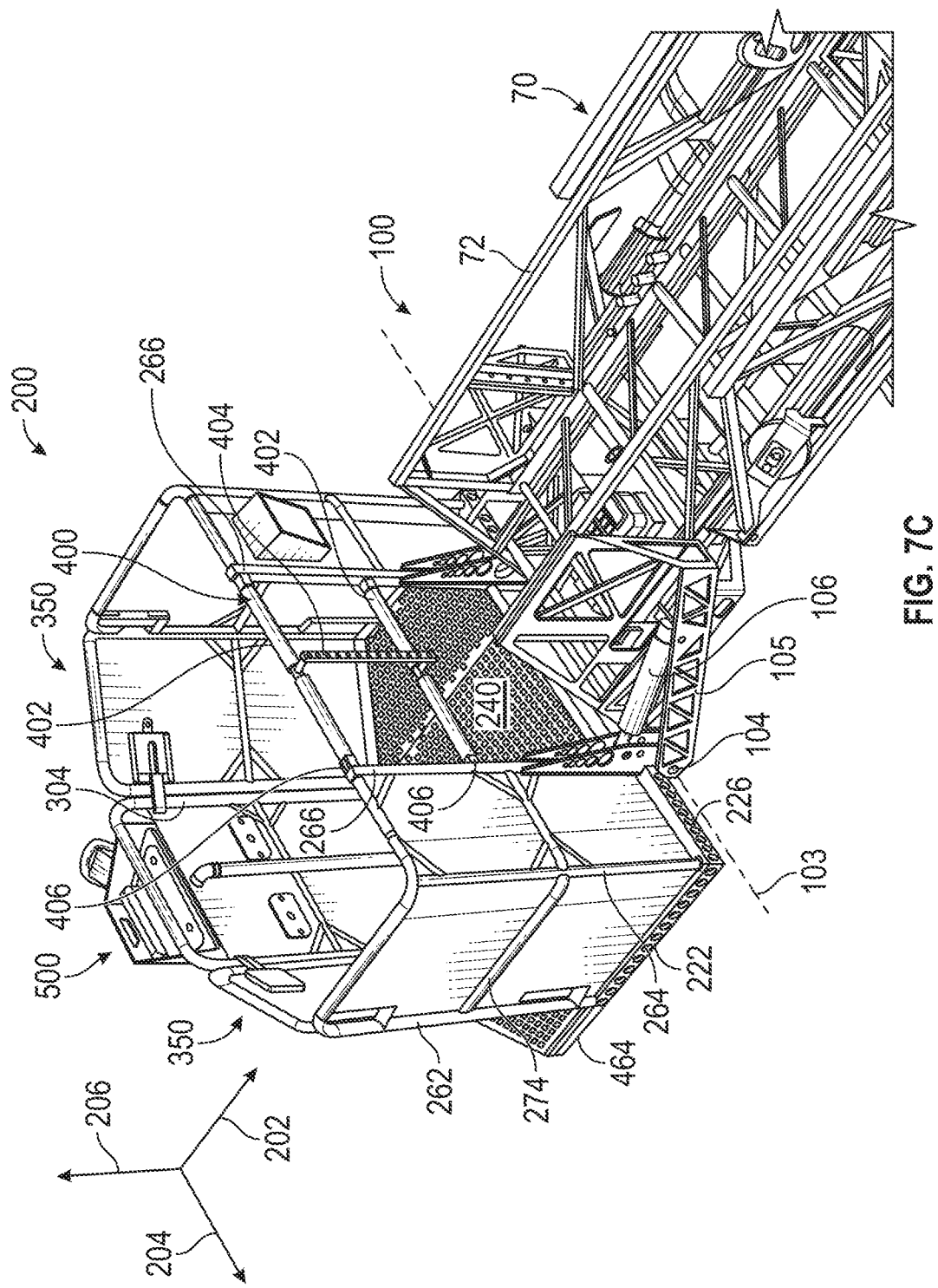
FIG. 7C is another perspective view of a section of the fire apparatus of FIG. 4A.
Figure 7D:
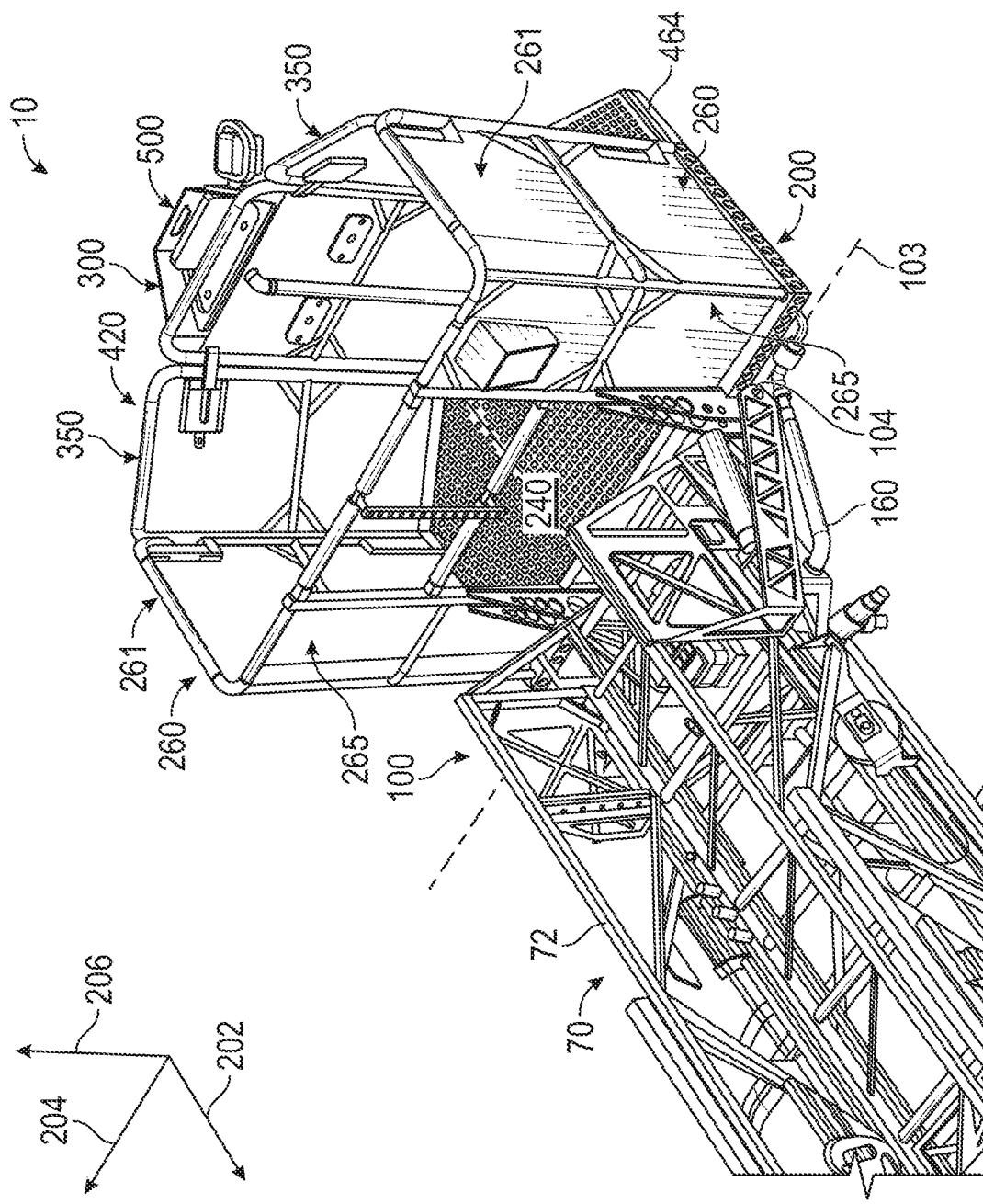
FIG. 7D is another perspective view of a section of the fire apparatus of FIG. 4A.
Figure 7E:
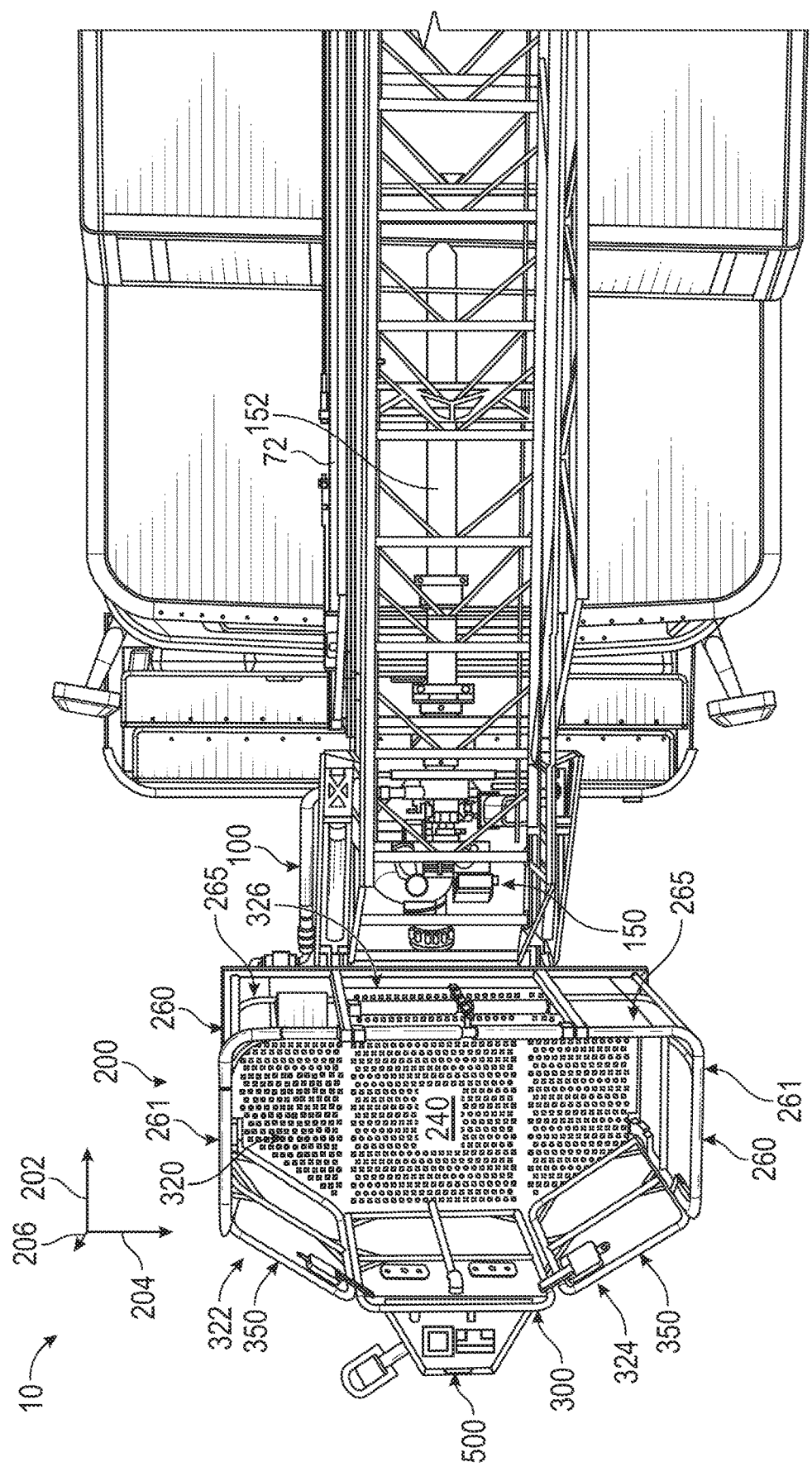
FIG. 7E is a top view of a section of the fire apparatus of FIG. 4A.

As shown in FIGS. 5A and 7E, the basket 200 includes a work platform, shown as floor panel 240, coupled to a top surface of the lower frame assembly 220. Floor panel 240 provides a surface upon which users or operators (e.g., fire fighters, rescue workers, etc.) may stand while operating the aerial ladder assembly 70. The floor panel 240 distributes the weight of the users throughout the lower frame assembly 220, supporting the users. In some embodiments, the floor panel 240 is made from one continuous piece of material. In other embodiments, the floor panel 240 is formed from a number of smaller sheets or panels. The floor panel 240 may define various cutouts (e.g., apertures, slots, etc.) around other components of the basket 200. The floor panel 240 may incorporate a surface that prevents the operator from slipping (e.g., a surface with raised perforations, a rubberized surface, etc.).

As shown in FIG. 8, the basket 200 further includes a pair of wall assemblies, shown as corner walls 260. There is one corner wall 260 disposed on each side of the longitudinal centerline of the basket 200. As shown in FIG. 8, the corner walls 260 each include a first wall or lateral wall, shown as side wall 261. As shown in FIGS. 8 and 9, the side walls 261 each include a first vertical or upright member, shown as side upright member 262 and a second vertical or upright member, shown as middle upright member 264. The corner walls 260 each further include a rear wall 265. The rear wall 265 shares the middle upright member 264 with the corresponding side wall 261 and further includes a third vertical or upright member, shown as rear upright member 266. Alternatively, each side wall 261 and each rear wall 265 may include a separate middle upright member 264. In such an embodiment, there may be a space between each side wall 261 and the corresponding rear wall 265.

The side upright members 262, the middle upright members 264, and the rear upright members 266 each extend vertically (i.e., in a vertical direction) and include an upper end portion and a lower end portion. The upper end portions are positioned above the floor panel, and the lower end portions are positioned below the floor panel. The lower end portion of each side upright member 262 is directly coupled to the corresponding outer member 222 and the corresponding angled member 228. The side upright members 262 are coupled to the lower frame assembly 220 near the intersections of the outer members 222 and the angled members 228. The lower end portion of each middle upright member 264 is directly coupled to the corresponding outer member 222 and the rear member 226. The middle upright members 264 are coupled to the lower frame assembly 220 near the intersections of the outer members 222 and the rear member 226. The lower end portion of each rear upright member 266 may be directly or indirectly coupled to the corresponding inner member 224 and the rear member 226. The rear upright members 266 are coupled to the lower frame assembly 220 near the intersections between the rear member 226 and the inner members 224. The side upright members 262, the middle upright members 264, and the rear upright members 266 each extend above the floor panel 240.

As shown in FIG. 8, the rear upright members 266 and the middle upright members 264 are longitudinally aligned (i.e., at the same longitudinal position). By way of example, a lateral axis could extend through both of the rear upright members 266 and both of the middle upright members 264. The middle upright members 264 are each laterally aligned with (i.e., at the same longitudinal position as) one of the side upright members 262. By way of example, a longitudinal line could extend through one of the middle upright members 264 and one of the side upright members 262. The inner members 224 are each laterally aligned with one of the rear upright members 266. By way of example, the inner members 224 are laterally offset a first distance from one another, the rear upright members 266 are laterally offset a second distance from one another, and the first distance and the second distance are approximately equal.

In some embodiments, the side upright members 262, the middle upright members 264, and/or the rear upright members 266 are coupled to a top surface of the lower frame assembly 220. In other embodiments, an aperture (e.g. a hole or a slot) is defined in the top surface of the lower frame assembly 220, and the side upright members 262, the middle upright members 264, and/or the rear upright members 266 are coupled to a surface of the lower frame assembly 220 below the top surface (e.g., an inside surface, a bottom surface, etc.). In yet other embodiments, the side upright members 262, the middle upright members 264, and/or the rear upright members 266 are each coupled to one or more side surfaces of the lower frame assembly 220.

As shown in FIGS. 8 and 9, the side walls 261 each further include an upper longitudinal member, shown as upper side member 270, and a middle longitudinal member, shown as middle side member 274. The upper side member 270 and the middle side member 274 each extend longitudinally and are substantially parallel to one another. The rear walls 265 each include an upper lateral member, shown as upper rear member 272, and a middle lateral member, shown as middle rear member 276. The upper rear member 272 and the middle rear member 276 each extend laterally and are substantially parallel to one another. The upper side member 270 is directly coupled to the upper end portion of the side upright member 262 and the upper end portion of the middle upright member 264. The upper rear member 272 is directly coupled to the upper end portion of the middle upright member 264 and the upper end portion of the rear upright member 266. The middle side member 274 is directly coupled to the side upright member 262 and the middle upright member 264 and located between the lower frame assembly 220 and the upper side member 270. The middle rear member 276 is directly coupled to the middle upright member 264 and the rear upright member 266 and located between the lower frame assembly 220 and the upper rear member 272. In some embodiments, one or more of the upper side member 270, the upper rear member 272, the middle side member 274, and the middle rear member 276 are oriented generally horizontally. As shown in FIG. 8, the side upright member 262, the middle upright member 264, the rear upright member 266, the upper side member 270, the upper rear member 272, the middle side member 274, and the middle rear member 276 of each corner wall 260 form a corner wall frame 280.

As shown in FIG. 5C, the basket 200 includes rear supports, shown as rear supports 290. The rear supports 290 are coupled to each side of the rear upright members 266 and oriented generally vertically. The rear supports 290 each define an aperture configured to receive one of the pivot pins 104, thereby pivotably coupling the basket to the mount assembly 100. The rear supports 290 may incorporate and/or couple to a bearing surface (e.g., a bushing, a bearing, etc.) that contacts the pivot pin 104 to better distribute the loading and mitigate wear. The apertures defined by the rear supports 290 are positioned adjacent the lower end portion of the rear upright members 266. Accordingly, the horizontal axis 103 about which the basket 200 rotates is positioned below the floor panel 240.

Figure 7F:
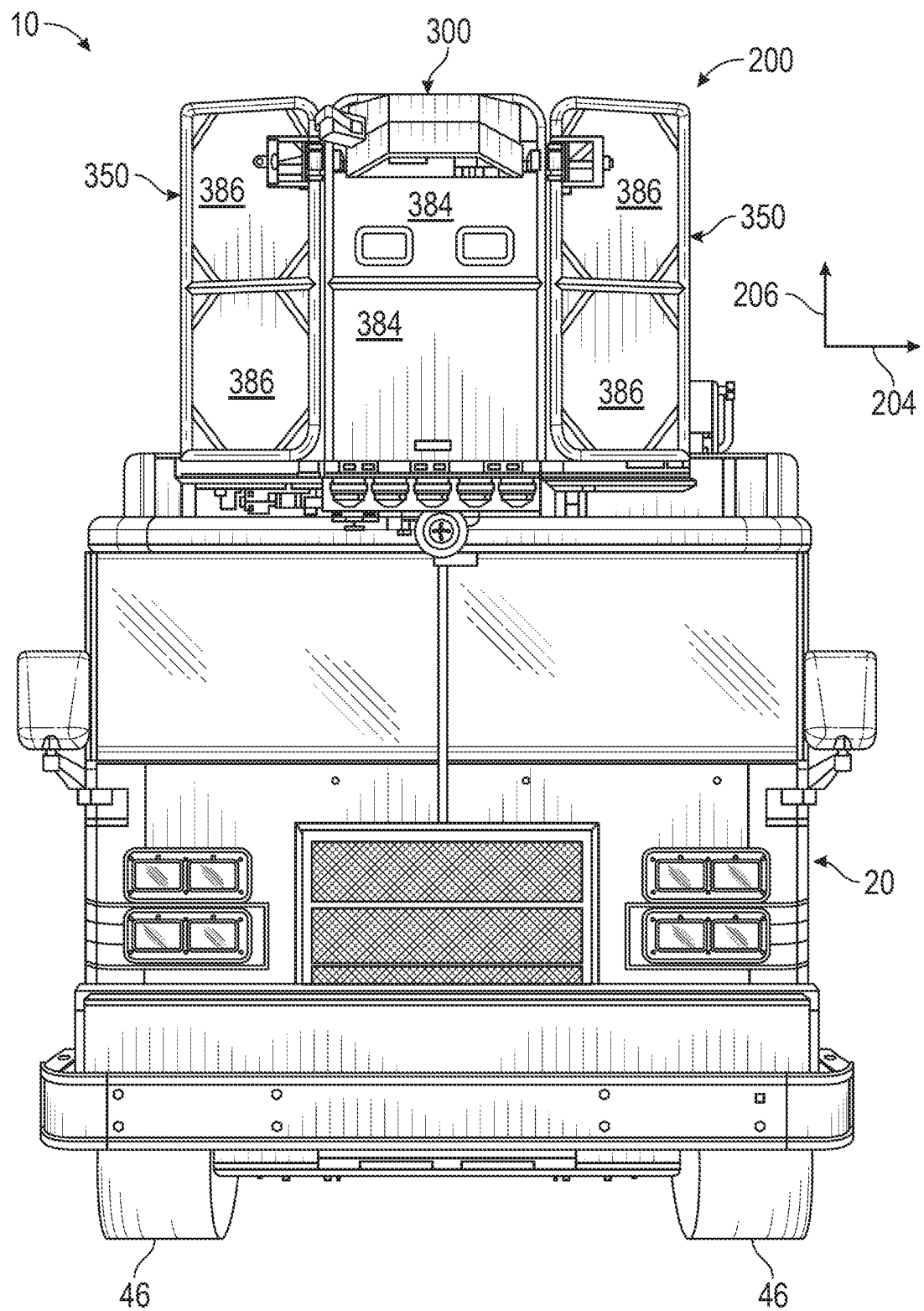
FIG. 7F is a front view of the fire apparatus of FIG. 4A.

As shown in FIGS. 7F and 8, the basket 200 further includes one or more front walls, shown as front wall 300. In some embodiments, the basket 200 includes one front wall 300 disposed along the longitudinal centerline of the basket 200. As shown in FIG. 8, the front wall 300 includes a frame, shown as front wall frame 302. As shown in FIG. 8, the front wall frame 302 includes a set of vertical or upright members, shown as front upright members 304, each including an upper end portion and a lower end portion. The upper end portion is positioned above the floor panel 240 and the lower end portion is positioned below the floor panel 240. The lower end portion of each front upright member 304 is directly or indirectly coupled to the front member 230, the corresponding inner member 224, and the corresponding angled member 228. The front upright members 304 are coupled to the lower frame assembly 220 proximate the intersections of the inner members 224, the angled members 228, and the front member 230. As shown in FIG. 8, the front wall frame 302 further includes a first lateral member, shown as upper front member 306, and a second lateral member, shown as middle front member 308. The upper front member 306 is directly coupled to the upper end portions of the front upright members 304. The middle front member 308 is directly coupled to the front upright members 304 and located between the upper front member 306 and the lower frame assembly 220. In some embodiments, one or both of the upper front member 306 and the middle front member 308 are oriented generally horizontally.

Referring to FIGS. 7E and 8, the basket 200 defines an enclosed area or working area 320 configured to contain one or more users. The working area 320 is a space defined above the floor panel 240 and between the corner walls 260 and the front wall 300. The basket 200 further defines a number of access openings configured to facilitate a user entering and/or exiting the working area 320 of the basket 200 from outside of the basket 200. A first access opening 322 is defined between one of the side walls 261 and the front wall 300, and a second access opening 324 is defined between the other of the side walls 261 and the front wall 300. Specifically, the first access opening 322 and the second access opening 324 are defined between one of the front upright members 304 and the nearest side upright member 262. Each front upright member 304 is offset longitudinally forward and laterally inward from the nearest side upright member 262. Accordingly, the first access opening 322 and the second access opening 324 are angled relative to the front wall 300 and the side wall 261. A third access opening 326 is defined between the rear walls 265. Specifically, the third access opening 326 is defined between the rear upright members 266. The rear upright members 266 are longitudinally aligned such that the third access opening 326 extends laterally.

Figure 10A:
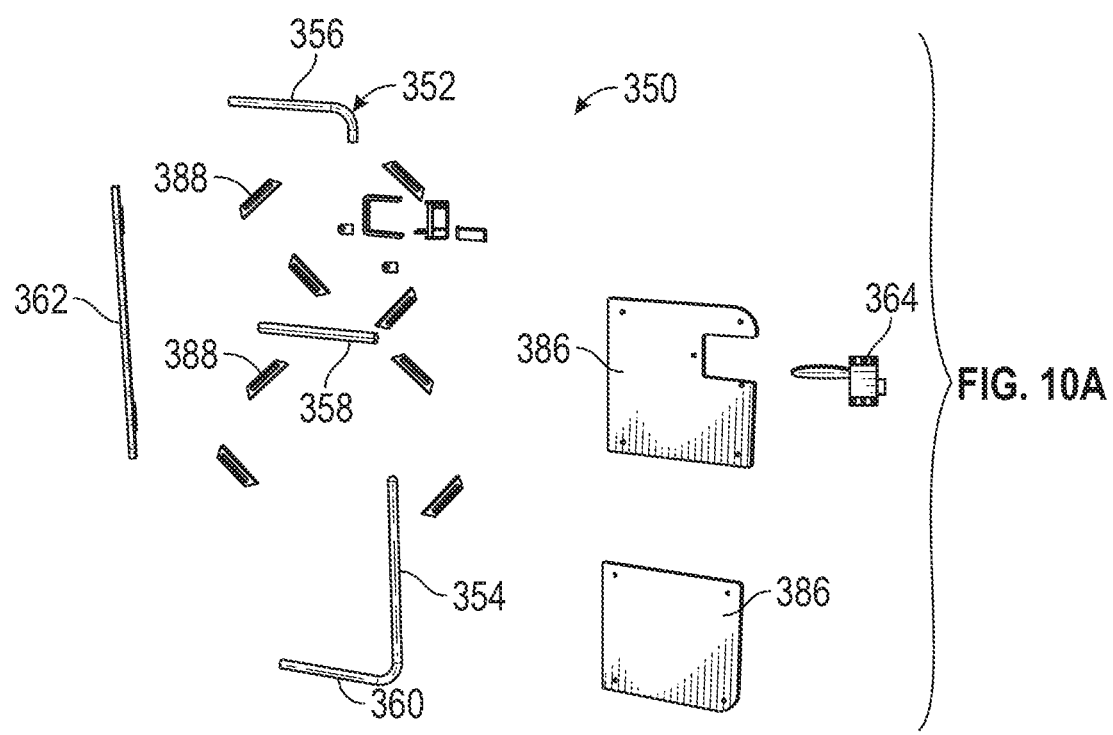
FIG. 10A is an exploded view of a front door of a basket of the fire apparatus of FIG. 4A, according to an exemplary embodiment.
Figure 10B:
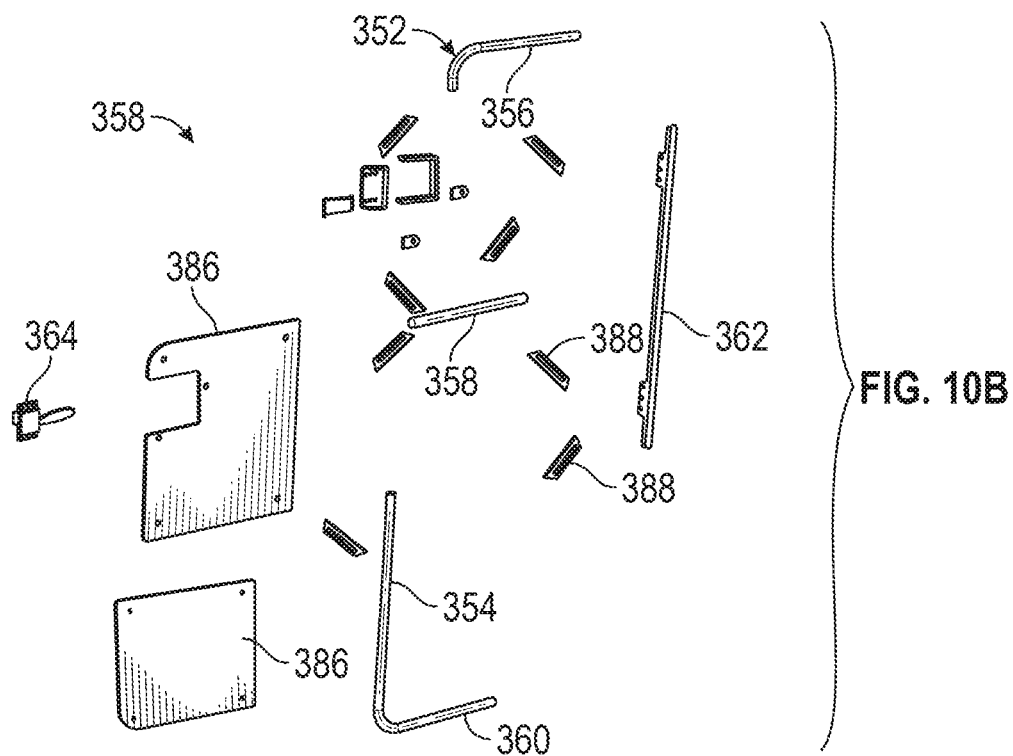
FIG. 10B is an exploded view of a front door of a basket of the fire apparatus of FIG. 4A, according to an exemplary embodiment.

As shown in FIGS. 7F, 10A, and 10B, the basket further includes a pair of front doors, shown as front doors 350. The front doors 350 facilitate the operators entering or exiting the working area 320 of the basket 200 through the first access opening 322 and the second access opening 324 while selectively closing to prevent accidental egress from the basket 200. As shown in FIGS. 10A and 10B, the front doors 350 include a front door frame, shown as front door frame 352, the front door frame 352 including a vertical or upright front door member, shown as vertical front door member 354, an upper horizontal front door member, shown as upper front door member 356, a middle horizontal front door member, shown as middle front door member 358, and a lower horizontal front door member, shown as lower front door member 360. The upper front door member 356, the middle front door member 358, and the lower front door member 360 are directly coupled to the vertical front door member 354. The upper front door member 356 is positioned near a top end of the vertical front door member 354. The lower front door member 360 is positioned near a bottom end of the vertical front door member 354. The middle front door member 358 is positioned between the upper front door member 356 and the lower front door member 360. In some embodiments, the upper front door member 356, the middle front door member 358, and the lower front door member 360 extend from the same side of the vertical front door member 354 (e.g., in the same direction).

As shown in FIGS. 10A and 10B, each front door 350 further includes a hinge 362 coupled to the front door frame 352. The hinge 362 pivotably couples the front door frame 352 to the corresponding side wall 261. In other embodiments, the hinge 362 pivotably couples the front door frame 352 to the front wall 300. In some embodiments, the front door 350 includes multiple hinges 362 to facilitate distributing the load on the front door 350 to the rest of the basket 200. The hinge 362 facilitates rotating the front door 350 about a vertical axis between a closed position, shown in FIG. 7E, and an open position. In the closed position, the front door 350 extends between the side wall 261 and the front wall 300, preventing movement of a user through the corresponding first access opening 322 or second access opening 324. In the open position, the front door 350 moves away from the side wall 261 or the front wall 300, allowing movement of a user through the corresponding first access opening 322 or second access opening 324. In some embodiments, the front door 350 opens by rotating inward such that the front door 350 extends within the working area 320 when in the open position. In other embodiments, the front door 350 opens by rotating outward. In yet other embodiments, the hinge 362 is omitted and the front door 350 instead includes a slide to facilitate the front door 350 translating relative to the other component of the basket 200.

As shown in FIGS. 10A and 10B, the front door 350 further includes a latch, shown as locking latch 364. The locking latch 364 is coupled to the side of the front door frame 352 opposite the hinge 362. As shown, the locking latch 364 selectively couples the front door 350 to the front wall 300. In other embodiments, the locking latch 364 selectively couples the front door 350 to the side wall 261. The locking latch 364 may be received by another component of the basket 200. The locking latch 364 is configured to prevent the front door 350 from opening (e.g., rotating, sliding, etc.) when in a locked position and to allow the front door 350 to move freely when in an unlocked position. The locking latch 364 is configured to move to the unlocked position in response to a user input (e.g., turning a knob, pressing a button, etc.). In some embodiments, when the front door 350 is closed (e.g., by the operator pushing or pulling), the locking latch 364 automatically moves to the locked position to prevent the front door 350 from opening.

Figure 11:
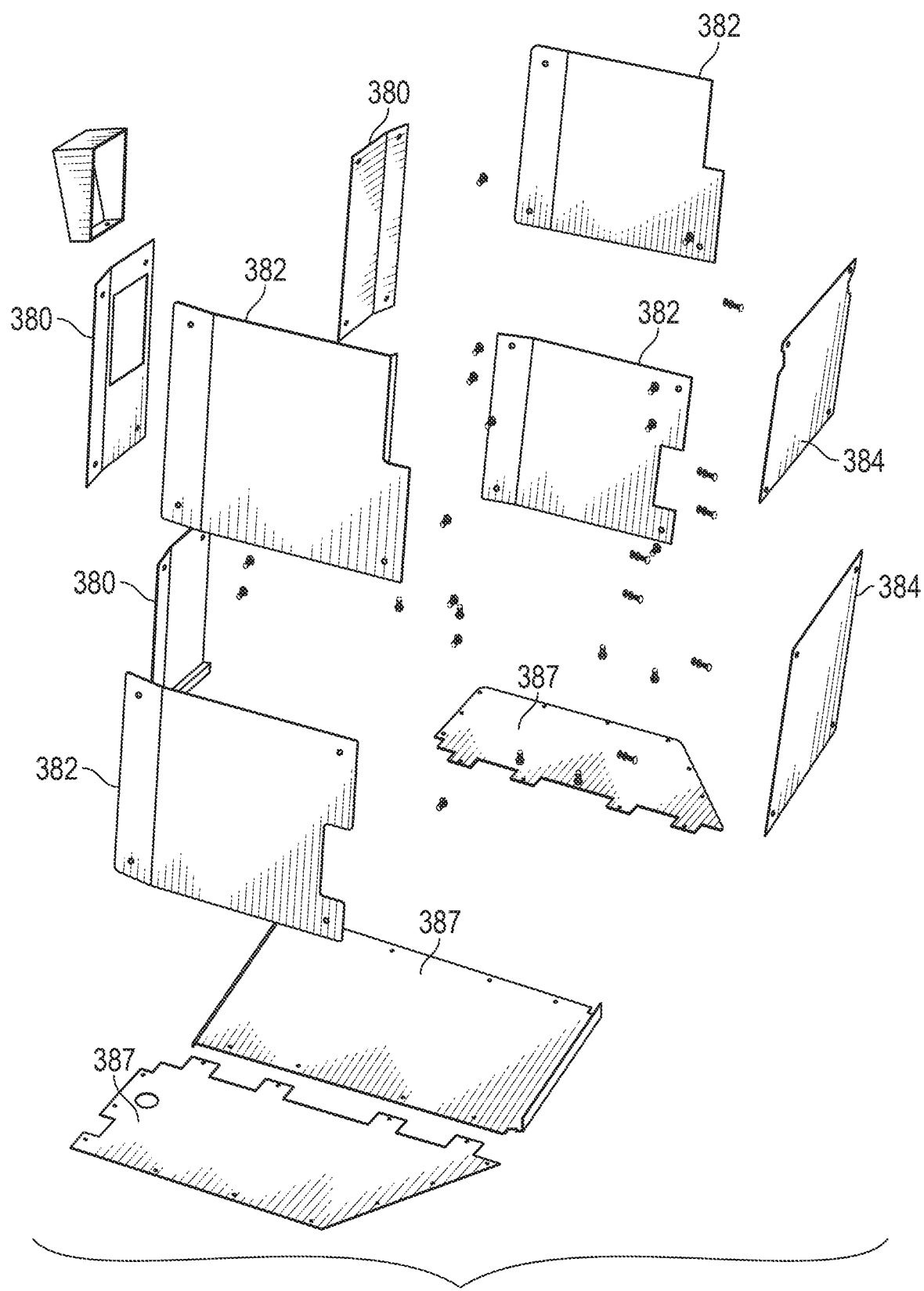
FIG. 11 is an exploded view of various heat-resistant panels of a basket of the fire apparatus of FIG. 4A, according to an exemplary embodiment.

As shown in FIGS. 5C and 11, the corner walls 260 each further include rear panels, shown as rear heat-resistant panels 380, and side panels, shown as side heat-resistant panels 382. As shown in FIGS. 7F and 11, the front wall 300 includes front panels, shown as front heat-resistant panels 384. As shown in FIGS. 7F, 10A, and 10B, the front doors 350 each include front door panels, shown as heat-resistant front door panels 386. As shown in FIG. 11, the lower frame assembly 220 includes bottom panels, shown as heat-resistant bottom panels 387, that extend along a bottom side of the lower frame assembly 220. The heat-resistant panels 380, 382, 384, 386, and 387 may be made from a heat-resistant material (e.g., an insulative material, a material that reflects thermal energy, etc.) to facilitate shielding the users in the working area 320 from nearby heat sources (e.g., a burning building). Specifically, the heat-resistant panels 380, 382, 384, and 386 reduce a rate of heat transfer from a heat source positioned outside of the basket 200 into the working area 320 relative to the basket 200 configured without the heat-resistant panels 380, 382, 384, 386, and 387. The heat-resistant panels 380, 382, 384, 386, and 387 cover or partially cover openings in the corner wall frames 280, the front wall frames 302, the front door frame 352, and the lower frame assembly 220. As shown in FIG. 5C, the corner wall frames 280, front wall frame 302, and front door frames 352 each include one or more connectors, shown as gusset plates 388. The gusset plates 388 may be coupled to other components of the corner wall frames 280, the front wall frame 302, the front door frames 352, and/or the lower frame assembly 220. The gusset plates 388 facilitate attachment of the heat-resistant panels 380, 382, 384, and 386 to the corner wall frames 280, front wall frame 302, front door frames 352, and/or the lower frame assembly 220. The heat-resistant bottom panels 387 may be directly coupled to one or more members of the lower frame assembly 220. In some embodiments, two or more of the heat-resistant panels are integrally formed as a single unitary body (e.g., are formed from a single piece of material)

As shown in FIG. 7C, the basket 200 further includes a door, shown as rear door 400, the rear door 400 including rear door members, shown as rear door members 402 and rear door handle, shown as rear door handle 404. The rear door members 402 are pivotably coupled to one of the rear upright members 266. As shown in FIG. 7C, the rear door members 402 are each received by an interface, shown as interface 406. The interfaces 406 may be coupled to the rear upright member 266 opposite the rear upright member 266 that is coupled to rear door members 402. In some embodiments, the rear door handle 404 is pivotably coupled to each of the rear door members 402 to form a four bar mechanism that includes the rear door members 402, the rear door handle 404, and the rear upright member 266. In some of these embodiments, the user may lift on the rear door handle 404 to rotate the rear door 400 about a horizontal axis to facilitate access to the basket 200 from the ladder 72. In other embodiments the rear door 400 rotates about a vertical axis. As shown in FIG. 7B, the rear door member 402, the upper rear members 272, the upper side members 270, the upper front door members 356, and the upper front member 306 cooperate to form an upper rail, shown as upper rail 420.

In some embodiments, two or more components of the basket 200 are integrally formed as a single unitary body (e.g., are formed from a single piece of tube). By way of example, as shown in FIG. 9, the upper rear member 272, the upper side member 270, and the side upright member 262 are formed from a single piece of bent tube. By way of another example, as shown in FIG. 9, the middle rear member 276 and the middle side member 274 are formed from a single piece of bent tube. In other embodiments, the rear heat-resistant panels 380 and the side heat-resistant panels may be integrally formed such that the corner wall frame 280 is covered by a single heat-resistant panel. In some embodiments, one or more components of the basket 200 are omitted. By way of example, the middle side member 274 and the middle rear member 276 may be omitted. In some embodiments, one or more components of the basket 200 shown as integrally formed may be separated into multiple sections. By way of example, the middle upright member 264 may be split into two separate sections. In some embodiments, various components of the basket 200 are made from steel having a 100,000 psi yield strength.

As shown in FIGS. 5A and 7A, the basket 200 further includes an extension or platform, shown as platform extension 460, that extends outside of the perimeter defined by the outermost edge of the rear door 400, the side walls 261, the front doors 350, and the front wall 300, and is supported by the lower frame assembly 220. The platform extension 460 may facilitate egress from and entrance onto the basket 200 (e.g., from a building). As shown in FIG. 7A, the platform extension 460 forms a cantilever structure. As shown in FIGS. 7A and 9, the platform extension 460 is supported by center platform supports, shown as center platform supports 462, by side platform supports, shown as side platform supports 464, and by a platform support rail, shown as platform support rail 466. A panel 468 is coupled to the platform support rail 466 and defines a top surface of the platform extension 460. The side platform supports 464 are coupled to the outer members 222 and extend longitudinally forward. The side platform supports 464 extend from the outer members 222 to the platform support rail 466. The center platform supports 462 are coupled to and extend longitudinally forward from the front upright members 304 and the inner members 224 towards the platform support rail 466. The center platform supports 462 extend upward along front upright members 304 and downwards along the inner members 224 to better support the cantilever structure. The center platform supports 462 and the side platform supports 464 are directly coupled to the platform support rail 466. The panel 468 is positioned such that a top surface of the panel 468 is substantially aligned with a top surface of the floor panel 240. In some embodiments, the floor panel 240 and the panel 468 are integrally formed from a single member. As shown in FIG. 7A, the panel 468 is positioned entirely between an outer surface of one side wall 261 and an outer surface of the other side wall 261. This arrangement reduces the overall width of the basket 200 while still facilitating access through the first access opening 322 and the second access opening 324.

Figure 12:
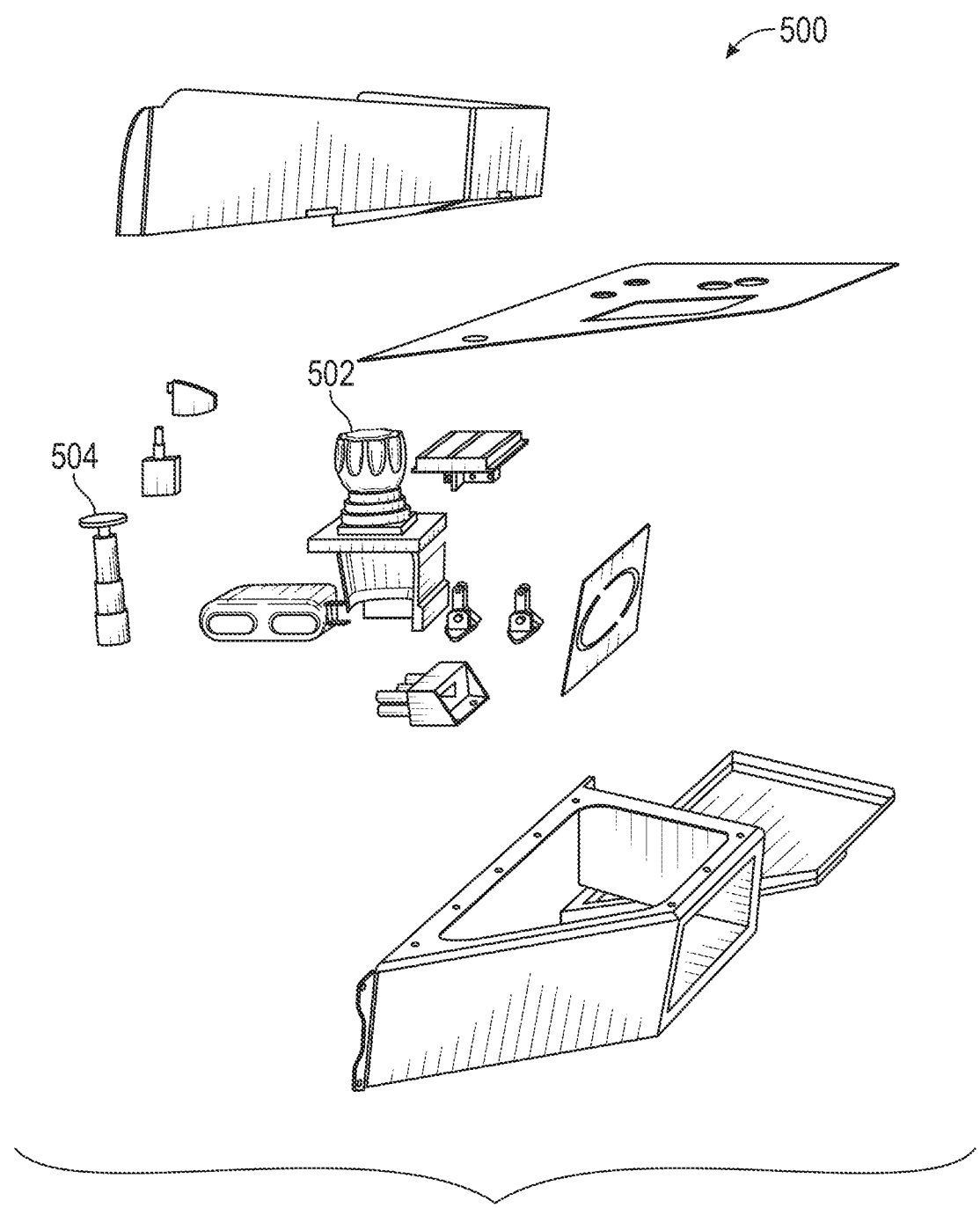
FIG. 12 is an exploded view of a control console of the fire apparatus of FIG. 4A, according to an exemplary embodiment.

As shown in FIGS. 7A and 12, the floor panel 240 provides a surface upon which operators can stand and control the aerial ladder assembly 70 the using an input/output (I/O) device, shown as a control console 500. In some embodiments, the control console 500 is coupled to the front wall 300. In other embodiments, the control console 500 is located elsewhere on the basket 200. The control console 500 is communicably coupled to a control system of the fire apparatus 10 such that information or signals (e.g., command signals, etc.) may be exchanged between the control console 500 and other components of the fire apparatus 10 (e.g., the ladder 72, the turntable 74, the waterway assembly 154, hydraulic pumps, etc.). According to an exemplary embodiment, the control console 500 enables an operator (e.g., fire fighter, etc.) of the fire apparatus 10 to control one or more components of the fire apparatus 10. By way of example, the control console 500 may include at least one of an interactive display, a touchscreen device, one or more buttons (e.g., a button configured to begin or cease water flow through the waterway assembly 154, etc.), joysticks, switches, and voice command receivers configured to receive a command input from the operator. As shown in FIG. 12, the control console 500 includes a joystick 502 and an emergency stop button 504. An operator may use the joystick 502 to control rotation of the turntable 74 relative to the chassis 16, rotation of the ladder 72 relative to the turntable 74, rotation of the basket 200 relative to the ladder 72, and extension and/or retraction of the ladder 72 to bring the basket 200 to a desired position (e.g., to the front, back, or side of fire apparatus 10, etc.). The emergency stop button 504 is configured to disable operation of the aerial ladder assembly 70 when pressed. In other embodiments, an operator may engage a lever associated with the control console 500 to trigger the extension or retraction of the plurality of sections of the aerial ladder assembly 70. In yet another embodiment, an operator may use the control console 500 to enable, disable, or direct various lights (e.g., lights located on the basket 200, etc.). In addition to the control console 500, the basket 200 may include various manual controls. By way of example, as shown in FIGS. 5C and 6, the basket 200 includes an interface, shown as handle 506, coupled to the shower nozzle 162. The handle 506 extends through the floor panel 240 and into the working area 320 so as to be accessible from inside the basket 200. When pulled, the handle 506 opens a valve within the shower nozzle 162 to initiate fluid flow through the shower nozzle 162.

As shown in FIGS. 7A-8, various components of the basket 200 are aligned with one another such that each of the components extend with a common plane. The components of each side wall 261 and the corresponding outer member 222 extend within a side plane of the basket 200. The components of both rear walls 265 and the rear member 226 extend within a back plane of the basket 200. The components of the front wall 300 and the front member 230 extend within a front plane of the basket 200. With the front doors 350 closed, the components of each front door 350 and the corresponding angled member 228 extend within an angled plane of the basket. The components of the lower frame assembly 220, the side platform supports 464, and the platform support rail extend within a bottom plane of the basket 200. The floor panel 240 and the panel 468 extend within a work surface plane of the basket 200.

Figure 13A:
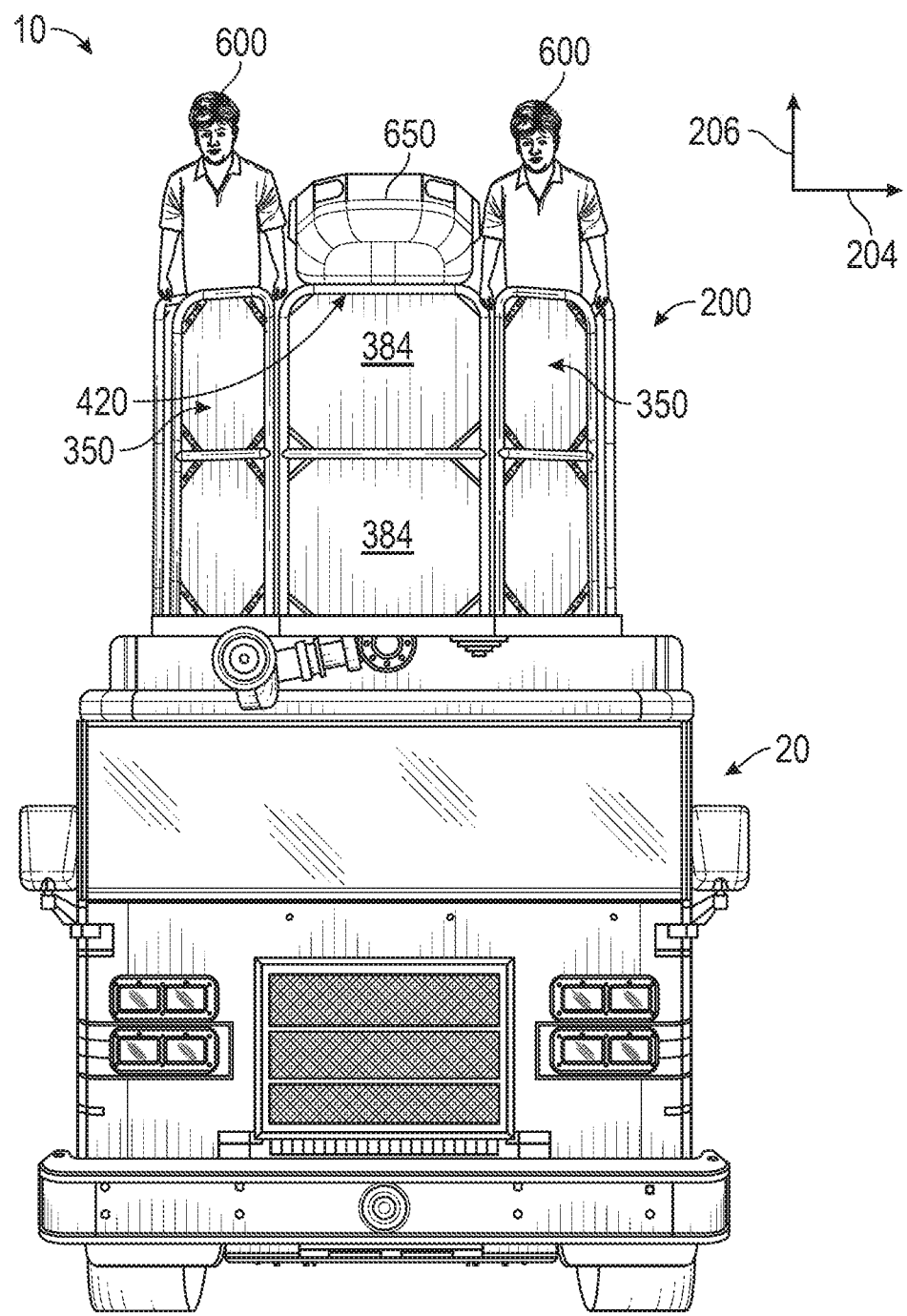
FIG. 13A is a front view of a fire apparatus, according to an exemplary embodiment.
Figure 13B:
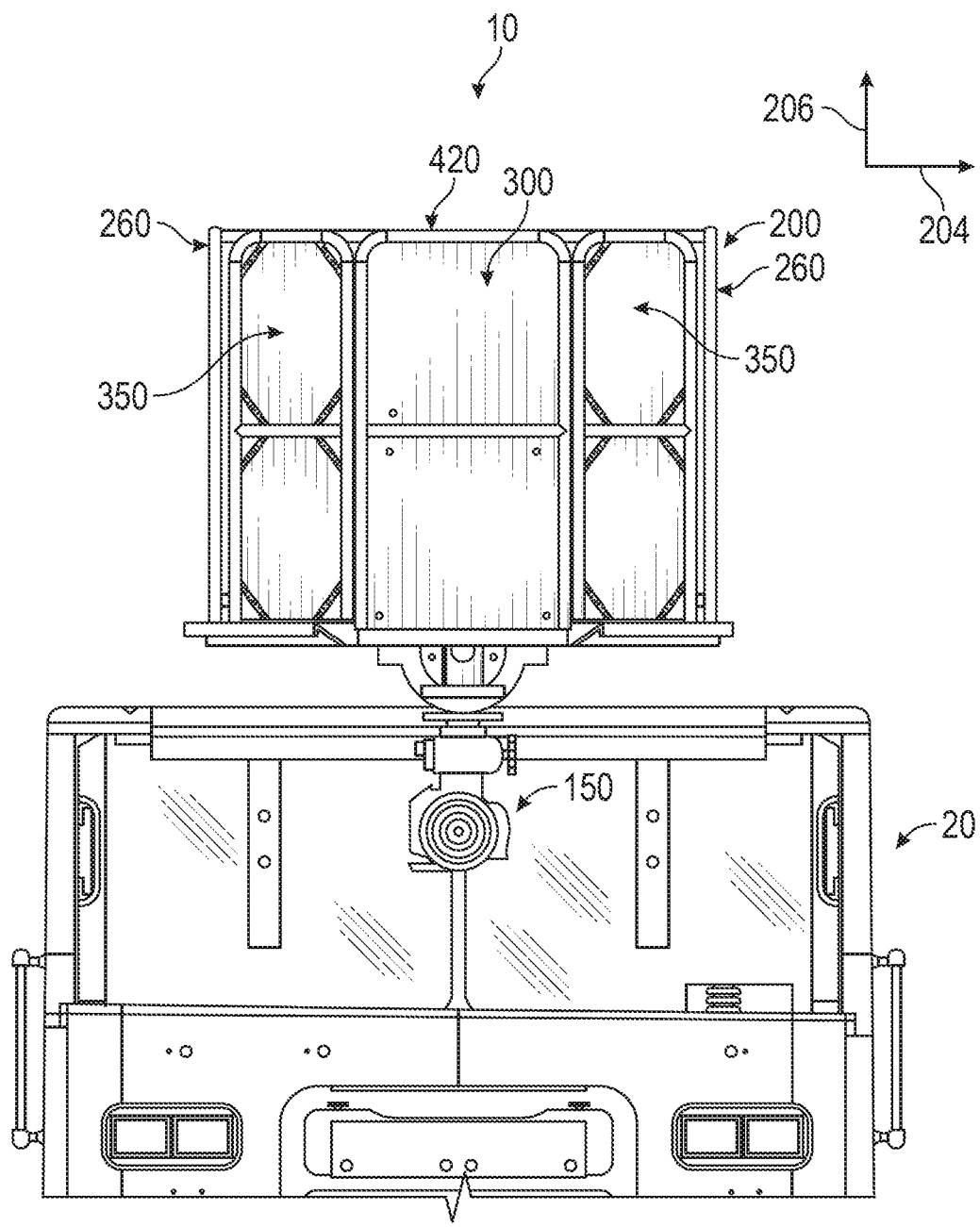
FIG. 13B is a front view of a fire apparatus, according to an exemplary embodiment.

FIGS. 13A and 13B show the basket 200 on the fire apparatus 10 in a fully retracted position. In some embodiments, the basket 200 is brought to the fully retracted position before driving the fire apparatus 10. A maximum driving height dimension is defined between the upper rail 420 and the ground when the basket 200 is in the fully retracted position. In some embodiments, the maximum driving height dimension is approximately 12.5 feet. In other embodiments, the maximum driving height dimension is less than or greater than 12.5 feet.

FIG. 13A shows the basket 200 staffed with two operators 600 and supporting a stokes basket 650, according to an exemplary embodiment. The stokes basket 650 is a piece of equipment used to transport an injured or otherwise disabled individual. In some embodiments, the upper rail 420 of the basket 200 is arranged such that the stokes basket 650 or another piece of equipment can be supported on the upper rail 420 at a minimum of two points. The upper rail 420 may have a uniform height relative to the floor panel 240 to facilitate holding the stokes basket 650 or other equipment level across the upper rail 420. In some embodiments, the working area 320 is large enough that the stokes basket 650 can be supported by the upper rail 420 with two operators standing in the working area 320. Without the stokes basket 650, the working area 320 is large enough for three operators. In some embodiments, the working area 320 is approximately 14 square feet. In other embodiments, the working area 320 is less than or greater than 14 square feet. In some embodiments, the dimensions of the basket 200 fit within certain guidelines and/or requirements (e.g., the requirements set by the National Fire Protection Association (NFPA)).

Figure 14A:
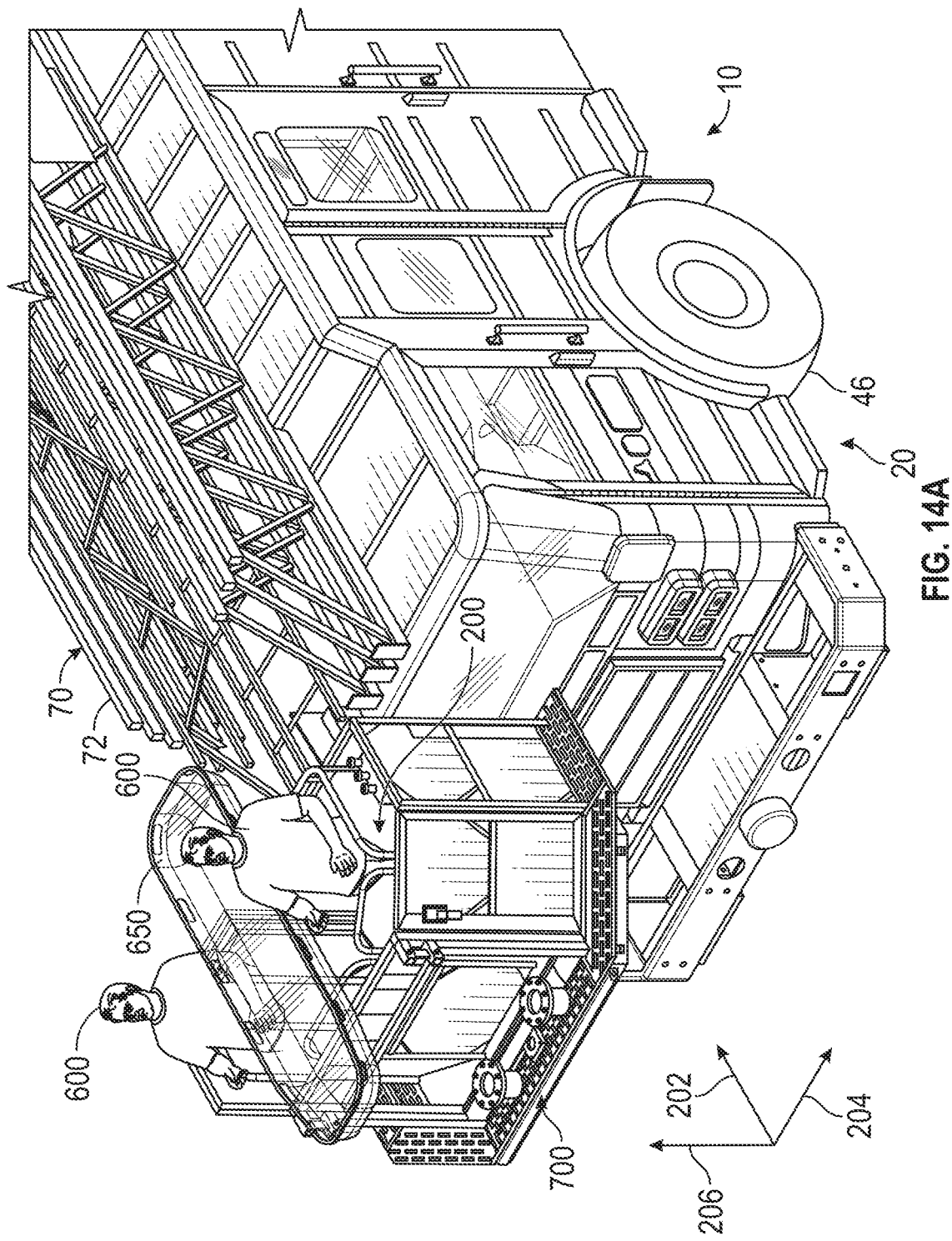
FIG. 14A is a perspective view of a fire apparatus, according to an exemplary embodiment.
Figure 14B:
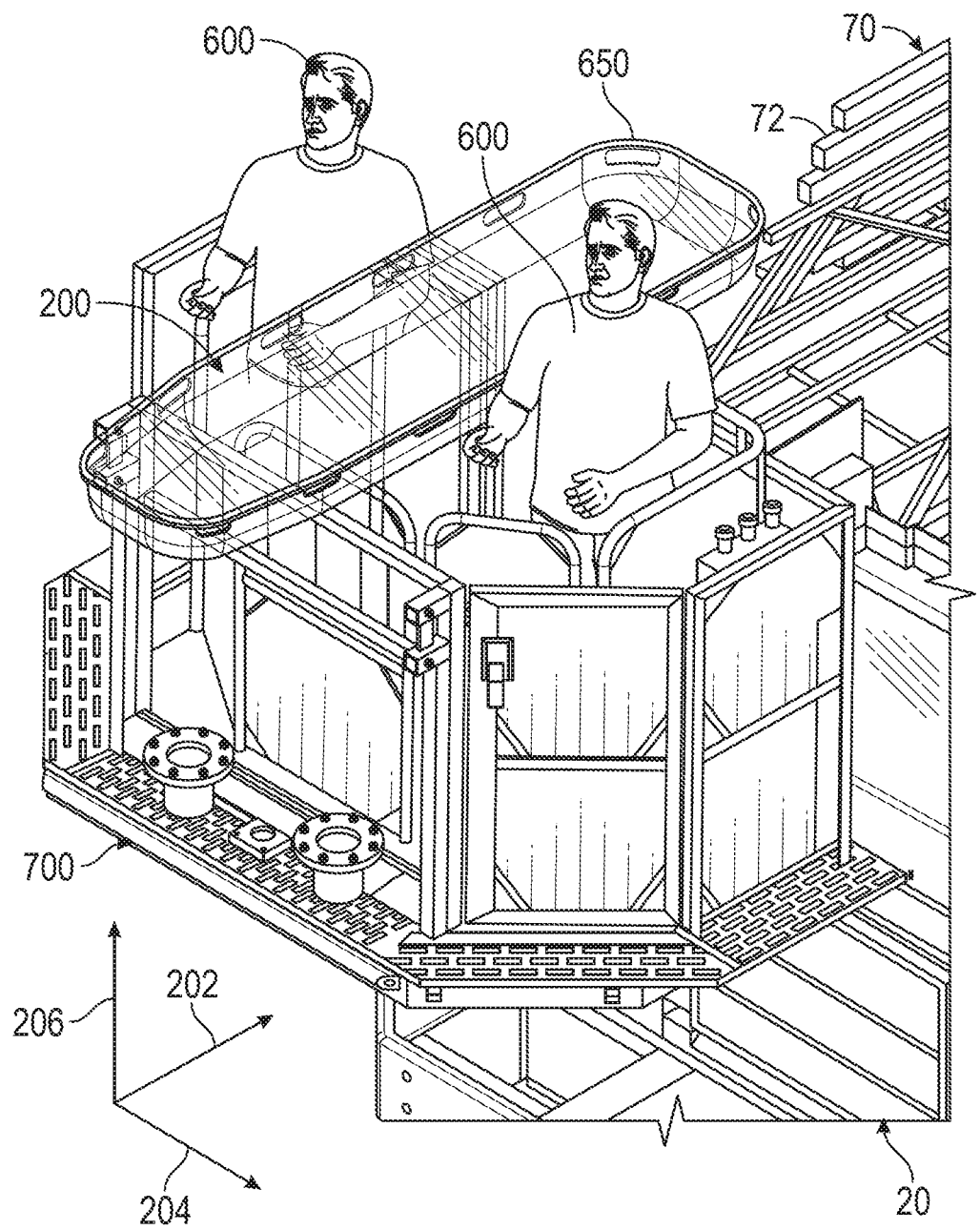
FIG. 14B is a perspective view of the fire apparatus of FIG. 14A.
Figure 14C:
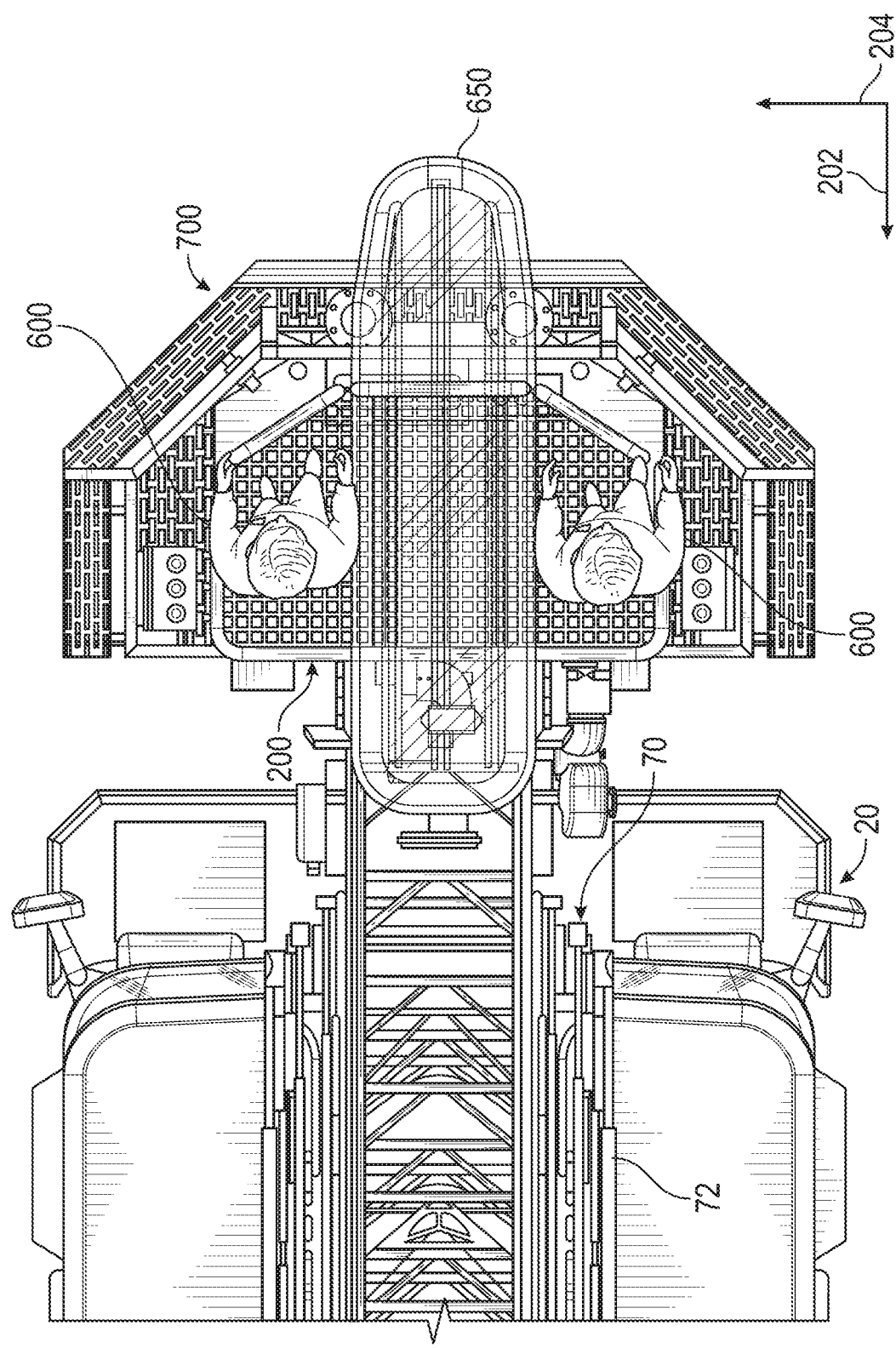
FIG. 14C is another perspective view of the fire apparatus of FIG. 14A.

FIGS. 14A-14C show a comparison of the basket 200 and another platform or basket 700. In some embodiments, an overall width of the basket 200 is smaller than an overall width of the other basket 700. In some embodiments, an overall depth of the basket 200 is smaller than an overall depth of the basket 700. The specific arrangement of the basket 200 outlined herein may facilitate the basket 200 supporting a larger or similar load to the basket 700 while remaining smaller and/or lighter than the basket 700. This reduction in size and/or weight may increase the capability of the fire apparatus 10 when compared to a fire apparatus incorporating the basket 700. In some embodiments, the fire apparatus 10 has a 110 foot vertical extension height and a 90 foot horizontal reach. In some embodiments, the vertical extension height of the fire apparatus 10 greater than or less than 110 feet. In some embodiments, the horizontal reach of the fire apparatus 10 is greater than or less than 90 feet. In some embodiments, the fire apparatus 10 can achieve the vertical extension height and the horizontal reach under one or more of the following conditions: with a 750 pound load in the basket 200; with a 500 pound load in the basket 200 while spraying water from the nozzle 150; while experiencing a 35 mile per hour wind; while coated in ¼" of ice. In some embodiments, the fire apparatus 10 can achieve the vertical extension height and the horizontal reach under one or more of the following conditions: with a greater than or less than 750 pound load in the basket 200; with a greater than or less than 500 pound load in the basket 200 while spraying water from the nozzle 150; while experiencing a greater than or less than 35 mile per hour wind; while coated in more or less than ¼" of ice. In some embodiments, the capacity of the fire apparatus 10 fits within certain guidelines and/or requirements (e.g., the requirements set by the NFPA).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A fire apparatus, comprising:
   a chassis;
   a ladder assembly having a proximal end pivotably coupled to the chassis and a distal end opposite the proximal end; and
   a basket pivotably coupled to the distal end of the ladder assembly, the basket comprising:
   a subfloor assembly, comprising:
      a front member extending in a first direction;
      a rear member extending in the first direction, wherein the front member and the rear member are offset a distance from one another in a second direction perpendicular to the first direction;
      an inner member extending from the front member to the rear member;
      an outer member having a first end portion coupled to the rear member and a second end portion opposite the first end portion; and an angled member extending from the second end portion of the outer member to the front member;

an upright member directly coupled to at least one of the outer member and the angled member and extending above the floor panel; and a floor panel coupled to a top surface of the subfloor assembly and configured to support a user, wherein the outer member is shorter than the distance between the front member and the rear member such that the angled member extends at an angle relative to the front member, and wherein the upright member is aligned with both the outer member and angled member.

2. The fire apparatus of claim 1, wherein a top surface of the angled member is coplanar with a top surface of at least one of (a) the front member, (b) the rear member, (c) the inner member, or (d) the outer member.

3. The fire apparatus of claim 1, wherein the upright member is a side upright member, and wherein the basket further comprises:

a front upright member directly coupled to at least one of the front member and the angled member and extending above the floor panel;

wherein the side upright member and the front upright member are offset from one another in both the first direction and the second direction, and wherein the side upright member and the front upright member define an access opening therebetween configured to facilitate the user exiting or entering the basket.

4. The fire apparatus of claim 3, wherein the basket further comprises:

a middle upright member directly coupled to at least one of the outer member and the rear member and extending above the floor panel; and a rear upright member directly coupled to at least one of the rear member and the inner member and extending above the floor panel;

wherein the rear upright member and the middle upright member are disposed within a first common plane extending in the first direction, and wherein the side upright member and the middle upright member are disposed within a second common plane extending in the second direction.

5. The fire apparatus of claim 1, wherein the basket further includes a front wall, a pair of rear walls, a first side wall, and a second side wall, each of said walls coupled to the subfloor assembly and extending above the floor panel, wherein the walls define an enclosed area of the basket therebetween;

wherein the front wall and the first side wall define a first access opening therebetween, wherein the front wall and the second side wall define a second access opening therebetween, and wherein the rear walls define a third access opening therebetween, each of the access openings configured to facilitate access to the enclosed area from outside of the basket;

wherein the first side wall and the second side wall are both offset from the front wall in the second direction, wherein the front wall and the first side wall are offset from one another in the first direction, and wherein the front wall and the second side wall are offset from one another in the first direction, such that the first access opening and the second access opening are angled relative to the front wall.

6. The fire apparatus of claim 5, wherein the basket further includes a first door pivotably coupled to the first side wall and a second door pivotably coupled to the second side wall, wherein the first door and the second door are each configured to move between an open position and a closed positon to selectively prevent movement through the first access opening and the second access opening, respectively, and wherein the first door and the second door are configured to extend within the enclosed area when in their respective open positions.

7. The fire apparatus of claim 6, wherein the front wall, the rear walls, the first side wall, the second side wall, the first door, and the second door each include heat-resistant panels configured to reduce a rate of heat transfer into the enclosed area from a heat source positioned away from the basket.

8. The fire apparatus of claim 5, further comprising a platform coupled to the subfloor assembly and having a top surface substantially aligned with a top surface of the floor panel, wherein the platform extends adjacent the first access opening on a side of the first access opening that is opposite the enclosed area, and wherein the platform is positioned entirely between an outer surface of the first side wall and an outer surface of the second side wall.

9. The fire apparatus of claim 1, wherein the upright member is a first upright member, wherein the basket further comprises a pair of second upright members each coupled to the subfloor assembly, wherein the second upright members extend below the floor panel, and wherein the ladder assembly is pivotably coupled to each second upright member such that the basket is configured to rotate relative to the ladder assembly about an axis of rotation positioned below the floor panel.

10. The fire apparatus of claim 1, wherein the upright member extends below the floor panel, and wherein the ladder assembly is pivotably coupled to the upright member such that the basket is configured to rotate relative to the ladder assembly about an axis of rotation positioned below the floor panel.

11. The fire apparatus of claim 1, wherein the ladder assembly is configured to extend and retract, and wherein the ladder assembly has a vertical extension height of at least 110 feet and at a horizontal reach of at least 90 feet when the basket supports a 750 pound load.

* * * * *